United States Patent
Ghanbarinejad et al.

(10) Patent No.: US 12,022,422 B2
(45) Date of Patent: Jun. 25, 2024

(54) POSITIONING CAPABILITY DATA EXCHANGE IN A NON-TERRESTRIAL NETWORK

(71) Applicant: Lenovo (United States) Inc., Morrisville, NC (US)

(72) Inventors: Majid Ghanbarinejad, Chicago, IL (US); Robin Thomas, Frankfurt am Main (DE); Sher Ali Cheema, Ilmenau (DE)

(73) Assignee: Lenovo (Singapore) PTE. LTD., Singapore (SG)

( * ) Notice: Subject to any disclaimer, the term of this patent is extended or adjusted under 35 U.S.C. 154(b) by 272 days.

(21) Appl. No.: 17/555,164

(22) Filed: Dec. 17, 2021

(65) Prior Publication Data

US 2023/0199694 A1    Jun. 22, 2023

(51) Int. Cl.
*H04W 64/00*    (2009.01)
*H04B 7/185*    (2006.01)
*H04W 84/06*    (2009.01)

(52) U.S. Cl.
CPC ........ *H04W 64/00* (2013.01); *H04B 7/18513* (2013.01); *H04W 84/06* (2013.01)

(58) Field of Classification Search
CPC .. H04W 64/00; H04W 84/06; H04B 7/18513; H04B 7/18556; H04B 7/18563
(Continued)

(56) References Cited

U.S. PATENT DOCUMENTS 11,963,129 B2    4/2024    Cheema et al.
2008/0177430 A1*   7/2008   Tekawy ................. B64G 1/405
                                                      701/13
(Continued)

FOREIGN PATENT DOCUMENTS

WO    2013181264 A1    12/2013
WO    2021155578 A1    8/2021

OTHER PUBLICATIONS

"5G System (5GS) Location Services (LCS)", 3rd Generation Partnership Project; Technical Specification Group Services and System Aspects, 3GPP TS 23.273 V17.2.0, 3GPP Organizational Partners, Valbonne, France [retrieved Feb. 2, 2022]. Retrieved from the Internet <http://www.3gpp.org>., Sep. 2021, 99 pages.

(Continued)

*Primary Examiner* — Don N Vo
(74) *Attorney, Agent, or Firm* — FIG. 1 Patents

(57) ABSTRACT

Various aspects of the present disclosure relate to a location server that transmits a control signaling request to a NTS in a non-terrestrial network, the control signaling requesting an entity type of the NTS, and ephemeris data associated with the NTS. The location server may transmit a control signaling request to a non-terrestrial network configuration entity in the non-terrestrial network, the control signaling requesting an identifier of the NTS, an entity type of the non-terrestrial network configuration entity, and/or a number of non-terrestrial network nodes communicatively connected to the non-terrestrial network configuration entity. The location server receives a control signaling response from the NTS and/or the non-terrestrial network configuration entity, the control signaling response indicating configuration parameter values. The location server then configures positioning assistance data for positioning a UE based in part on the configuration parameter values received in the control signaling response.

20 Claims, 21 Drawing Sheets

(58) Field of Classification Search
USPC .................................................. 455/456.2
See application file for complete search history.

(56) References Cited

U.S. PATENT DOCUMENTS

| | | | |
|---|---|---|---|
| 2013/0257648 A1* | 10/2013 | Garin | G01S 19/42 |
| | | | 342/357.25 |
| 2014/0292564 A1* | 10/2014 | Park | H04W 4/029 |
| | | | 342/357.2 |
| 2015/0018010 A1 | 1/2015 | Fischer | |
| 2015/0382318 A1 | 12/2015 | Kim et al. | |
| 2018/0048444 A1 | 2/2018 | Park et al. | |
| 2021/0144539 A1 | 5/2021 | Edge et al. | |
| 2021/0239783 A1 | 8/2021 | Calcev et al. | |
| 2021/0306869 A1 | 9/2021 | Wei et al. | |
| 2022/0408497 A1* | 12/2022 | Matsuda | H04W 74/002 |
| 2023/0194649 A1 | 6/2023 | Thomas et al. | |
| 2023/0199685 A1 | 6/2023 | Ghanbarinejad et al. | |
| 2023/0199701 A1 | 6/2023 | Cheema et al. | |

OTHER PUBLICATIONS

"Evolved Universal Terrestrial Radio Access (E-UTRA): Physical channels and modulation", 3rd Generation Partnership Project, Technical Specification Group Radio Access Network, 3GPP TS 36.211 V16.7.0, 3GPP Organizational Partners, Valbonne, France [retrieved Feb. 2, 2022]. Retrieved from the Internet <http://www.3gpp.org>., Sep. 2021, 249 pages.

"LTE Positioning Protocol (LPP)", 3rd Generation Partnership Project, Technical Specification Group Radio Access Network, 3GPP TS 37.355 V16.4.0, 3GPP Organizational Partners, Valbonne, France [retrieved Feb. 2, 2022]. Retrieved from the Internet <http://www.3gpp.org>., Mar. 2021, 298 pages.

"LTE Positioning Protocol (LPP)", 3rd Generation Partnership Project, Technical Specification Group Radio Access Network, 3GPP TS 37.355 V16.6.0, 3GPP Organizational Partners, Valbonne, France [retrieved Feb. 2, 2022]. Retrieved from the Internet <http://www.3gpp.org>., Sep. 2021, 299 pages.

"NG Radio Access Network (NG-RAN): Stage 2 functional specification of User Equipment (UE) positioning in NG-RAN", 3rd Generation Partnership Project, Technical Specification Group Radio Access Network, 3GPP TS 38.305 V16.6.0, 3GPP Organizational Partners, Valbonne, France [retrieved Feb. 2, 2022]. Retrieved from the Internet <http://www.3gpp.org>., Sep. 2021, 120 pages.

"NG-RAN: Architecture description", 3rd Generation Partnership Project, Technical Specification Group Radio Access Network, 3GPP TS 38.401 V16.7.0, 3GPP Organizational Partners, Valbonne, France [retrieved Feb. 2, 2022]. Retrieved from the Internet <http://www.3gpp.org>., Oct. 2021, 79 pages.

"NG-RAN: NR Positioning Protocol A (NRPPa)", 3rd Generation Partnership Project, Technical Specification Group Radio Access Network, 3GPP TS 38.455 V16.5.0, 3GPP Organizational Partners, Valbonne, France [retrieved Feb. 2, 2022]. Retrieved from the Internet <http://www.3gpp.org>., Oct. 2021, 152 pages.

"NR: Physical layer measurements", 3rd Generation Partnership Project, Technical Specification Group Radio Access Network, 3GPP TS 38.215 V16.3.0, 3GPP Organizational Partners, Valbonne, France [retrieved Feb. 2, 2022]. Retrieved from the Internet <http://www.3gpp.org>., Sep. 2020, 25 pages.

"Procedures for the 5G System (5GS)", 3rd Generation Partnership Project, Technical Specification Group Services and System Aspects, 3GPP TS 23.502 V17.2.1, 3GPP Organizational Partners, Valbonne, France [retrieved Feb. 2, 2022]. Retrieved from the Internet <http://www.3gpp.org>., Sep. 2021, 712 pages.

"System architecture for the 5G System (5GS)", 3rd Generation Partnership Project; Technical Specification Group Services and System Aspects, 3GPP TS 23.501 V17.2.0, 3GPP Organizational Partners, Valbonne, France [retrieved Feb. 2, 2022]. Retrieved from the Internet <http://www.3gpp.org>., Sep. 2021, 542 pages.

Cheema, Sher et al., "U.S. Application as Filed", U.S. Appl. No. 63/121,475, filed Dec. 4, 2020, 42 pages.

Cheema, Sher Ali et al., "U.S. Application as Filed", U.S. Appl. No. 17/554,689, filed Dec. 17, 2021, 68 pages.

Ghanbarinejad, Majid et al., "U.S. Application as Filed", U.S. Appl. No. 17/554,916, filed Dec. 17, 2021, 79 pages.

Thomas, Robin et al., "U.S. Application as Filed", U.S. Appl. No. 17/554,583, filed Dec. 17, 2021, 80 pages.

Guidotti, A., et al., "Architectures, standardisation, and procedures for 5G Satellite Communications: A survey", Computer Networks, vol. 183 [retrieved Feb. 3, 2023]. Retrieved from the Internet <https://doi.org/10.1016/j.comnet.2020.107588>, Dec. 24, 2020, 18 pages.

Lenovo, Motorola Mobility, "Positioning Latency Reduction Enhancements", 3GPP TSG RAN WG2 Meeting#115-e, R2-2108127 [retrieved May 3, 2023]. Retrieved from the Internet <https://www.3gpp.org/ftp/tsg_ran/WG2_RL2/TSGR2_115-e/Docs>., Aug. 2021, 11 Pages.

PCT/IB2022/062251, "International Search Report and Written Opinion", PCT Application No. PCT/IB2022/062251, dated Mar. 3, 2023, 12 pages.

PCT/IB2022/062257, "International Search Report and Written Opinion", PCT Application No. PCT/IB2022/062257, dated Mar. 13, 2023, 16 pages.

PCT/IB2022/062333, "International Search Report and Written Opinion", PCT Application No. PCT/IB2022/062333, dated Mar. 16, 2023, 6 pages.

PCT/IB2022/062336, "International Search Report and Written Opinion", PCT Application No. PCT/IB2022/062336, dated May 9, 2023, 16 pages.

ZTE, et al., "Discussion on positioning latency reduction", 3GPP TSG-RAN WG2 Meeting #116 electronic, R2-2109460, Online [retrieved May 3, 2023]. Retrieved from the Internet <https://www.3gpp.org/ftp/tsg_ran/WG2_RL2/TSGR2_116-e/Docs>., Nov. 2021, 6 Pages.

ZTE Corporation, et al., "Consideration on system information and cell (re)selection in NTN", 3GPP TSG-RAN WG2 Meeting#111, R2-2006872, Electronic [retrieved Mar. 16, 2023]. Retrieved from the Internet <https://www.3gpp.org/ftp/tsg_ran/WG2_RL2/TSGR2_111-e/Docs>, Aug. 2020, 6 pages.

U.S. Appl. No. 17/554,689, "Non-Final Office Action", U.S. Appl. No. 17/554,689, filed Aug. 30, 2023, 16 pages.

U.S. Appl. No. 17/554,689, "Corrected Notice of Allowability", U.S. Appl. No. 17/554,689, Mar. 13, 2024, 2 pages.

* cited by examiner

```
-- ASN1START

NR-DL-TDOA-ProvideAssistanceData-r16 ::= SEQUENCE {
    nr-DL-PRS-AssistanceData-r16      NR-DL-PRS-AssistanceData-r16        OPTIONAL,    -- Need ON
    nr-SelectedDL-PRS-IndexList-r16   NR-SelectedDL-PRS-IndexList-r16     OPTIONAL,    -- Need ON
    nr-PositionCalculationAssistance-r16
                                      NR-PositionCalculationAssistance-r16
                                                                          OPTIONAL,    -- Cond UEB
    nr-DL-TDOA-Error-r16              NR-DL-TDOA-Error-r16                OPTIONAL,    -- Need ON
    ...
}
-- ASN1STOP
```

FIG. 2 — 200

```
-- ASN1START

NR-DL-TDOA-SignalMeasurementInformation-r16 ::= SEQUENCE {
    dl-PRS-ReferenceInfo-r16      DL-PRS-IdInfo-r16,
    nr-DL-TDOA-MeasList-r16       NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                 INTEGER (0..255),
    nr-PhysCellID-r16             NR-PhysCellID-r16                       OPTIONAL,
    nr-CellGlobalID-r16           NCGI-r15                                OPTIONAL,
    nr-ARFCN-r16                  ARFCN-ValueNR-r15                       OPTIONAL,
    nr-DL-PRS-ResourceId-r16      NR-DL-PRS-ResourceId-r16                OPTIONAL,
    nr-DL-PRS-ResourceSetId-r16   NR-DL-PRS-ResourceSetId-r16             OPTIONAL,
    nr-TimeStamp-r16              NR-TimeStamp-r16,
    nr-RSTD-r16                   CHOICE {
        k0-r16                        INTEGER (0..1970049),
        k1-r16                        INTEGER (0..985025),
        k2-r16                        INTEGER (0..492513),
        k3-r16                        INTEGER (0..246257),
        k4-r16                        INTEGER (0..123129),
        k5-r16                        INTEGER (0..61565),
        ...
    },
    nr-AdditionalPathList-r16     NR-AdditionalPathList-r16               OPTIONAL,
    nr-TimingQuality-r16          NR-TimingQuality-r16,
    nr-DL-PRS-RSRP-Result-r16     INTEGER (0..126)                        OPTIONAL,
    nr-DL-TDOA-AdditionalMeasurements-r16
                                  NR-DL-TDOA-AdditionalMeasurements-r16   OPTIONAL,
    ...
}

NR-DL-TDOA-AdditionalMeasurements-r16 ::= SEQUENCE (SIZE (1..3)) OF
                                          NR-DL-TDOA-AdditionalMeasurementElement-r16

NR-DL-TDOA-AdditionalMeasurementElement-r16 ::= SEQUENCE {
    nr-DL-PRS-ResourceId-r16      NR-DL-PRS-ResourceId-r16                OPTIONAL,
    nr-DL-PRS-ResourceSetId-r16   NR-DL-PRS-ResourceSetId-r16             OPTIONAL,
    nr-TimeStamp-r16              NR-TimeStamp-r16,
    nr-RSTD-ResultDiff-r16        CHOICE {
        k0-r16                        INTEGER (0..8191),
        k1-r16                        INTEGER (0..4095),
        k2-r16                        INTEGER (0..2047),
        k3-r16                        INTEGER (0..1023),
        k4-r16                        INTEGER (0..511),
        k5-r16                        INTEGER (0..255),
        ...
    },
    nr-TimingQuality-r16          NR-TimingQuality-r16,
    nr-DL-PRS-RSRP-ResultDiff-r16 INTEGER (0..61)                         OPTIONAL,
    nr-AdditionalPathList-r16     NR-AdditionalPathList-r16               OPTIONAL,
    ...
}

-- ASN1STOP
```

FIG. 3 — 300

```
-- ASN1START
RequestCapabilities ::= SEQUENCE {
    criticalExtensions      CHOICE {
        c1                          CHOICE {
            requestCapabilities-r9      RequestCapabilities-r9-IEs,         1602
            requestNTN-Capabilities-r18 RequestNTN-Capabilities-r18-IEs,
            spare3 NULL, spare2 NULL, spare1 NULL
        },
        criticalExtensionsFuture    SEQUENCE {}                              1604
    }
}

-- Remark: Existing Positioning Capabilities for Terrestrial Networks (TN):
RequestCapabilities-r9-IEs ::= SEQUENCE {
    commonIEsRequestCapabilities        CommonIEsRequestCapabilities        OPTIONAL,   -- Need ON
    a-gnss-RequestCapabilities          A-GNSS-RequestCapabilities          OPTIONAL,   -- Need ON
    otdoa-RequestCapabilities           OTDOA-RequestCapabilities           OPTIONAL,   -- Need ON
    ecid-RequestCapabilities            ECID-RequestCapabilities            OPTIONAL,   -- Need ON
    epdu-RequestCapabilities            EPDU-Sequence                       OPTIONAL,   -- Need ON
    ...,
    [[  sensor-RequestCapabilities-r13  Sensor-RequestCapabilities-r13      OPTIONAL,   -- Need ON
        tbs-RequestCapabilities-r13     TBS-RequestCapabilities-r13         OPTIONAL,   -- Need ON
        wlan-RequestCapabilities-r13    WLAN-RequestCapabilities-r13        OPTIONAL,   -- Need ON
        bt-RequestCapabilities-r13      BT-RequestCapabilities-r13          OPTIONAL,   -- Need ON
    ]],
    [[  nr-ECID-RequestCapabilities-r16 NR-ECID-RequestCapabilities-r16     OPTIONAL,   -- Need ON
        nr-Multi-RTT-RequestCapabilities-r16
                                        NR-Multi-RTT-RequestCapabilities-r16
                                                                            OPTIONAL,   -- Need ON
        nr-DL-AoD-RequestCapabilities-r16
                                        NR-DL-AoD-RequestCapabilities-r16   OPTIONAL,   -- Need ON
        nr-DL-TDOA-RequestCapabilities-r16
                                        NR-DL-TDOA-RequestCapabilities-r16  OPTIONAL,   -- Need ON
        nr-UL-RequestCapabilities-r16   NR-UL-RequestCapabilities-r16       OPTIONAL    -- Need ON
    ]]
}

-- Remark: New Positioning Capabilities for Non-Terrestrial Networks (NTN):
RequestNTN-Capabilities-r18-IEs ::= SEQUENCE {
    [[
        nr-ECID-RequestCapabilities     NR-ECID-RequestCapabilities         OPTIONAL,   -- Need ON
        nr-Multi-RTT-RequestCapabilities
                                        NR-Multi-RTT-RequestCapabilities-r18
                                                                            OPTIONAL,   -- Need ON
        nr-DL-AoD-RequestCapabilities
                                        NR-DL-AoD-RequestCapabilities-r18   OPTIONAL,   -- Need ON
        nr-DL-TDOA-RequestCapabilities
                                        NR-DL-TDOA-RequestCapabilities-r18  OPTIONAL,   -- Need ON
        nr-DopplerAssisted-RequestCapabilities
                                        NR-DL-RequestCapabilities-r18       OPTIONAL,   -- Need ON
        nr-UL-RequestCapabilities       NR-UL-RequestCapabilities-r18       OPTIONAL    -- Need ON
    ]]
}
-- ASN1STOP
```
1606

```
-- ASN1START

RequestCapabilities ::= SEQUENCE {
    criticalExtensions      CHOICE {
        c1                      CHOICE {
            requestCapabilities-r9      RequestCapabilities-r9-IEs,
            spare3 NULL, spare2 NULL, spare1 NULL
        },
        criticalExtensionsFuture    SEQUENCE {}
    }
}

RequestCapabilities-r9-IEs ::= SEQUENCE {
    commonIEsRequestCapabilities        CommonIEsRequestCapabilities       OPTIONAL,   -- Need ON
    a-gnss-RequestCapabilities          A-GNSS-RequestCapabilities          OPTIONAL,   -- Need ON
    otdoa-RequestCapabilities           OTDOA-RequestCapabilities           OPTIONAL,   -- Need ON
    ecid-RequestCapabilities            ECID-RequestCapabilities            OPTIONAL,   -- Need ON
    epdu-RequestCapabilities            EPDU-Sequence                       OPTIONAL,   -- Need ON
    ...,
    [[  sensor-RequestCapabilities-r13     Sensor-RequestCapabilities-r13     OPTIONAL,   -- Need ON
        tbs-RequestCapabilities-r13        TBS-RequestCapabilities-r13        OPTIONAL,   -- Need ON
        wlan-RequestCapabilities-r13       WLAN-RequestCapabilities-r13       OPTIONAL,   -- Need ON
        bt-RequestCapabilities-r13         BT-RequestCapabilities-r13         OPTIONAL    -- Need ON
    ]],
    [[  nr-ECID-RequestCapabilities-r16    NR-ECID-RequestCapabilities-r16    OPTIONAL,   -- Need ON
        nr-Multi-RTT-RequestCapabilities-r16
                                           NR-Multi-RTT-RequestCapabilities-r16
                                                                              OPTIONAL,   -- Need ON
        nr-DL-AoD-RequestCapabilities-r16
                                           NR-DL-AoD-RequestCapabilities-r16  OPTIONAL,   -- Need ON
        nr-DL-TDOA-RequestCapabilities-r16
                                           NR-DL-TDOA-RequestCapabilities-r16 OPTIONAL,   -- Need ON
        nr-UL-RequestCapabilities-r16      NR-UL-RequestCapabilities-r16      OPTIONAL    -- Need ON
    ]],
    [[  nr-NTN-ECID-RequestCapabilities    NR-ECID-RequestCapabilities        OPTIONAL,   -- Need ON
        nr-NTN-Multi-RTT-RequestCapabilities
                                           NR-Multi-RTT-RequestCapabilities-r16
                                                                              OPTIONAL,   -- Need ON
        nr-NTN-DL-AoD-RequestCapabilities
                                           NR-DL-AoD-RequestCapabilities-r16  OPTIONAL,   -- Need ON
        nr-NTN-DL-TDOA-RequestCapabilities
                                           NR-DL-TDOA-RequestCapabilities-r16 OPTIONAL,   -- Need ON
        nr-NTN-DopplerAssisted-RequestCapabilities
                                           NR-UL-RequestCapabilities-r16      OPTIONAL,   -- Need ON
        nr-NTN-UL-RequestCapabilities      NR-UL-RequestCapabilities-r16      OPTIONAL    -- Need ON
    ]]
}

-- ASN1STOP
```
1702

```
-- ASN1START
-- New IE:
NTN-TRPMeasurementQuantities ::= SEQUENCE (SIZE (1..maxnoPosMeas)) OF NTN-
TRPMeasurementQuantitiesList-Item NTN-TRPMeasurementQuantitiesList-Item ::= SEQUENCE {
    ntn-tRPMeasurementQuantities-Item      NTN-TRPMeasurementQuantities-Item,
    ntn-timingReportingGranularityFactor   INTEGER (0..5) OPTIONAL,
    iE-Extensions                          ProtocolExtensionContainer { { NTN-TRPMeasurementQuantitiesList-Item-ExtIEs} } OPTIONAL,
    ...
}

NTN-TRPMeasurementQuantitiesList-Item-ExtIEs NRPPA-PROTOCOL-EXTENSION ::= {
    ...
}

NTN-TRPMeasurementQuantities-Item ::= ENUMERATED {
    gNB-RxTxTimeDiff,
    uL-SRS-RSRP,
    uL-AoA,
    uL-RTOA,
    uL-DopplerFrequency,
    ...
}

NTN-TrpMeasurementResult ::= SEQUENCE (SIZE (1.. maxnoPosMeas)) OF NTN-TrpMeasurementResultItem
NTN-TrpMeasurementResultItem ::= SEQUENCE {
    measuredResultsValue       NTN-TrpMeasuredResultsValue,
    timeStamp                  TimeStamp,
    measurementQuality         NTN-TrpMeasurementQuality      OPTIONAL,
    measurementBeamInfo        MeasurementBeamInfo            OPTIONAL,
    iE-Extensions              ProtocolExtensionContainer { {NTN-TrpMeasurementResultItem-ExtIEs} } OPTIONAL,
    ...
}

NTN-TrpMeasurementResultItem-ExtIEs NRPPA-PROTOCOL-EXTENSION ::= {
    ...
}

NTN-TrpMeasuredResultsValue ::= CHOICE {
    uL-AngleOfArrival      UL-AoA,
    uL-SRS-RSRP            UL-SRS-RSRP,
    uL-RTOA                UL-RTOAMeasurement,
    gNB-RxTxTimeDiff       GNB-RxTxTimeDiff,
    uL-DopplerFrequency    UL-DopplerFrequency,
    choice-Extension       ProtocolIE-Single-Container { { NTN-TrpMeasuredResultsValue-ExtIEs } }
}

NTN-TrpMeasuredResultsValue-ExtIEs NRPPA-PROTOCOL-IES ::= {
    ...
}
-- ASN1STOP
```

FIG. 26

```
-- ASN1START
(New RAT value added) in red:

OtherRATMeasurementQuantities ::= SEQUENCE (SIZE (0.. maxNoMeas)) OF ProtocolIE-Single-Container {
{OtherRATMeasurementQuantities-ItemIEs} }

OtherRATMeasurementQuantities-ItemIEs NRPPA-PROTOCOL-IES ::= {
    { ID id-OtherRATMeasurementQuantities-Item   CRITICALITY reject   TYPE
OtherRATMeasurementQuantities-Item PRESENCE mandatory}}

OtherRATMeasurementQuantities-Item ::= SEQUENCE {
    otherRATMeasurementQuantitiesValue          OtherRATMeasurementQuantitiesValue,
    iE-Extensions                               ProtocolExtensionContainer { {
OtherRATMeasurementQuantitiesValue-ExtIEs} } OPTIONAL,
    ...
}

OtherRATMeasurementQuantitiesValue-ExtIEs NRPPA-PROTOCOL-EXTENSION ::= {
    ...
}

OtherRATMeasurementQuantitiesValue ::= ENUMERATED {
    geran,
    utran,
    ...,
    nr,
    (nr-NTN,)
    sutra
}                  ~2704
-- ASN1STOP
```

POSITIONING CAPABILITY DATA EXCHANGE IN A NON-TERRESTRIAL NETWORK

TECHNICAL FIELD

The present disclosure relates to wireless communications, and more specifically to positioning capability data exchange in a non-terrestrial network (NTN).

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5 G.

In some cases, a wireless communications system may be an NTN, which may support various communication devices to support wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances. In a positioning system for an NTN, one or more location servers, or components of the location servers, may communicate with one or multiple UEs connected to the NTN over a wireless medium. In some cases, in an NTN, propagation delays can be orders of magnitude longer than those in a typical terrestrial network (TN). Additionally, satellites, or any other non-terrestrial transmit-receive points (NT-TRPs) may be moving at high speeds, for example in the case of low-earth orbit (LEO) and medium-earth orbit (MEO) satellite systems. Other non-terrestrial systems, such as geosynchronous satellite systems, may also introduce wireless communication challenges due to NT-TRP movements.

SUMMARY

The present disclosure relates to methods, apparatuses, and systems that enable a communication device (e.g., a UE, a base station, a network entity) to perform measurement of reference signals (such as, positioning reference signals (PRS)) and reporting of positioning information of the communication device in an NTN. For example, the communication device may be configured with a positioning reference signal (PRS) configuration, and the communication device may perform PRS measurement and reporting of positioning information according to RAT-dependent positioning operations in an NTN. In some implementations, the communication device may receive the PRS configuration from a location server configured with a location management function (LMF). The PRS configuration may include one or more parameters for supporting accurate measurement and reporting of positioning information of the communication device in a low-latency manner, accounting for moving TRPs, higher Doppler shift, and long propagation delays in the NTN.

By supporting measurement and reporting according to RAT-dependent positioning operations in an NTN, a communication device may verify its location and perform optimized low-latency radio positioning. For example, a communication device, such as UE in wireless communication with a satellite in an NTN may report location using onboard devices, which needs to be verified by the network using RAT-dependent positioning methods. Additionally, by supporting measurement and reporting according to RAT-dependent positioning operations in an NTN, a communication device may experience improved NTN positioning in rural and remote areas, where cellular TRPs are otherwise rare, intermittent, or non-existent. Additionally, satellites in LEO and MEO systems travel on predictable trajectories and at high speeds, causing a significant Doppler effect in signals received on the ground, which may also be taken into account for positioning enhancements.

In aspects of the disclosure, signaling according to the new radio positioning protocol A (NRPPa) is implemented to accommodate positioning processes in an NTN. The positioning processes are initiated by next generation radio access network (NG-RAN) signaling among various network entities, such as transmit-receive points (TRPs) and the location server that implements the LMF in the core network (5GCN). The described NTN positioning enables the configuration, processing, measurement, and reporting features for RAT-dependent positioning processes to accommodate UE connected to the NTN. The positioning processes in an NTN are adapted for the configuration, signaling, and behavior of the various communication entities, such as the UE, NT-TRPs (e.g., a satellite), the location server that implements the LMF, gateway nodes, and functions at other network entities. The described NTN positioning enables the configuration, processing, measurement, and reporting features for RAT-dependent positioning processes to accommodate UE connected to the NTN. Accordingly, request-response signaling methods and location capability exchange procedures are implemented, such as between an NTN TRP (e.g., satellite) and a location server that implements the LMF; between an NTN gateway and the location server that implements the LMF; and between a UE and the location server that implements the LMF.

Some implementations of the method and apparatuses described herein may further include positioning capability exchange signaling at a location server in an NTN, such as a location server that implements the LMF. The location server includes a transceiver to transmit a control signaling request to a NTS, such as a satellite, in a non-terrestrial network. The control signaling requests an entity type of the NTS, and ephemeris data associated with the NTS. The location server transceiver also receives a control signaling response from the NTS, and the control signaling response indicates configuration parameter values. The location server may then configure positioning assistance data for positioning a UE based in part on the configuration parameter values received in the control signaling response.

Some implementations of the method and apparatuses described herein may further include positioning capability exchange signaling at a location server in an NTN, such as a location server that implements the LMF. The location server includes a transceiver to transmit a control signaling request to a non-terrestrial network configuration entity, such as a gateway or other NTN configuration entity, in a non-terrestrial network. The control signaling requests an identifier of a NTS, ephemeris data associated with the NTS, an entity type of the non-terrestrial network configuration entity, and/or a number of non-terrestrial network nodes communicatively connected to the non-terrestrial network configuration entity. The location server transceiver also receives a control signaling response from the non-terrestrial network configuration entity, and the control signaling response indicates configuration parameter values. The location server may then configure positioning assistance data for positioning a UE based in part on the configuration parameter values received in the control signaling response.

BRIEF DESCRIPTION OF THE DRAWINGS

Various aspects of the present disclosure for positioning capability data exchange in an NTN are described with reference to the following Figures. The same numbers may be used throughout to reference like features and components shown in the Figures.

FIG. 2 illustrates an example of assistance data configuration with respect to UE measurement and report configuration signaling, adaptable for positioning capability data exchange in an NTN in accordance with aspects of the present disclosure.

FIG. 3 illustrates an example of a positioning measurement report with respect to UE measurement and report configuration signaling, adaptable for positioning capability data exchange in an NTN in accordance with aspects of the present disclosure.

FIG. 16 illustrates an example of the RequestCapabilities information element (IE) as related to positioning capability data exchange in an NTN in accordance with aspects of the present disclosure.

FIG. 17 illustrates an example of ASN.1 code for the RequestCapabilities as related to positioning capability data exchange in an NTN in accordance with aspects of the present disclosure.

FIG. 26 illustrates another example of ASN.1 code for an information element (IE) as related to positioning capability data exchange in an NTN in accordance with aspects of the present disclosure.

FIG. 27 illustrates another example of ASN.1 code for an information element (IE) as related to positioning capability data exchange in an NTN in accordance with aspects of the present disclosure.

DETAILED DESCRIPTION

Figure 1:
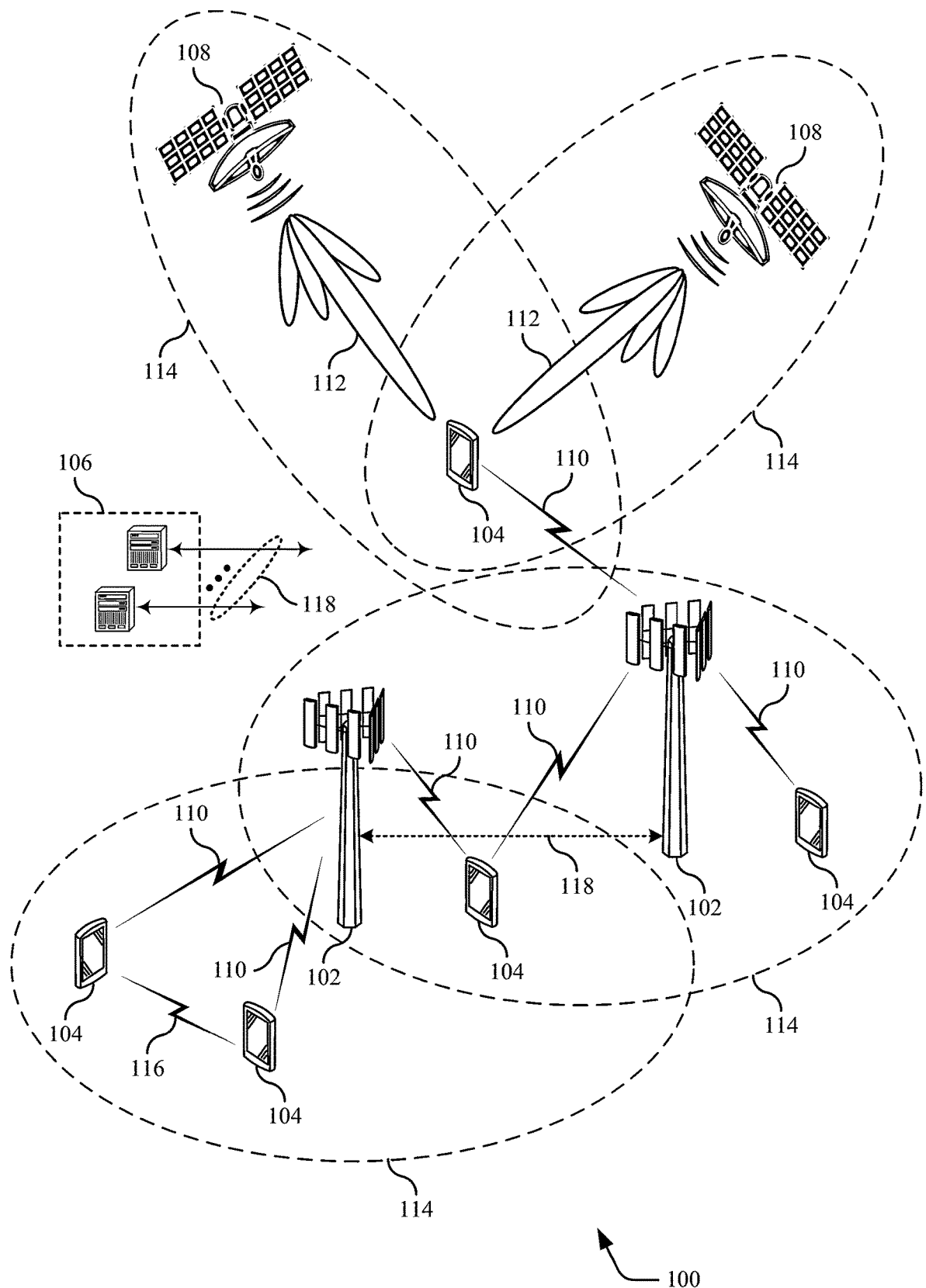
FIG. 1 illustrates an example of a wireless communications system that supports positioning capability data exchange in an NTN in accordance with aspects of the present disclosure.

Implementations of positioning capability data exchange in an NTN are described, such as related to PRS configuration, measurement, processing, and reporting utilizing RAT-dependent positioning for UE connected to an NTN. The configuration signaling parameters from a location server that implements a LMF are adapted to facilitate a target UE being able to report accurate positioning measurements in a low-latency manner, taking into consideration the moving TRPs, higher Doppler shift, and long propagation delays. The present disclosure provides configuration, reporting, and signaling enhancements to support the RAT-dependent positioning procedures over an NTN using 3GPP NR technology and radio access node (RAN) functionality that supports signaling procedures to enable the RAT NR positioning.

An NTN may include satellites and gateway entities transmitting and receiving over long distances with location servers and UE connected to the NTN for wireless communications. Notably, the moving TRPs, higher Doppler shift, and long propagation delays add levels of complexity to enable wireless communications utilizing NG-RAN technology in an NTN. Procedures for PRS configuration, measurement, processing, and reporting are lacking for NTN entities, such as for satellites and gateway network entities in the third-generation partnership project (3GPP) positioning architecture. Further, regulatory and emergency services requirements need to be addressed, so that configured PRS resources and reported positioning measurements are conveyed to a target UE in a timely manner, particularly given the RTT delays experienced in an NTN. For effective network-based positioning in an NTN, a location server that implements a LMF needs to receive the measurement report and location estimates from a UE in a low-latency manner, which introduces a challenge given the extended propagation times over which the positioning reports and estimates are communicated in an NTN.

The positioning processes in an NTN take into account several different considerations than those for typical TN positioning, such as the longer propagation delays, moving satellites in the case of LEO and/or MEO satellite systems, larger pathloss, uncertainty about the number of satellites in range at any particular moment, and so on. The positioning processes in an NTN also utilize different and/or additional positioning data than for TN positioning, such as ephemeris data related to satellite movements and satellite architecture information, such as an architecture based on a regenerative payload architecture (RPA) model or a transparent payload architecture (TPA) model. For typical TN positioning, the LMF does not need the NT-related configuration information for a positioning process for a UE, given that TRPs are capable of positioning at network nodes with gNBs (base stations) that are typically static (e.g., non-moving), and their signal strength, communication capabilities, behaviors, etc. are more predictable. Whereas, in an NTN, the LMF may not have sufficient node information to configure signaling, particularly when a signaling failure may occur as the number of satellites in communication range changes dynamically.

In aspects of the disclosure for positioning capability data exchange in an NTN, signaling according to the new radio positioning protocol A (NRPPa) is implemented to accommodate positioning processes in an NTN. The positioning processes are initiated by NG-RAN signaling among various network entities, such as transmit-receive points (TRPs) and the location server that implements the LMF in the core network (5GCN). The location server that implements the LMF has a central role in NR positioning by configuring the positioning processes, performing request-response signaling with the entities that compute and communicate the positioning of a UE, and so on. The positioning processes in an NTN are adapted for the configuration, signaling, and behavior of the various communication entities, such as the UE, NT-TRPs (e.g., a satellite), the location server that implements the LMF, gateway nodes, and functions at other network entities. The described NTN positioning enables the configuration, processing, measurement, and reporting features for RAT-dependent positioning processes to accommodate UE connected to the NTN. Accordingly, request-response signaling methods and location capability exchange procedures are implemented, such as between an NTN TRP (e.g., satellite) and a location server that implements the LMF; between an NTN gateway and the location server that implements the LMF; and between a UE and the location server that implements the LMF.

The positioning processes in an NTN may utilize positioning data that includes the type of NTN node, such as a geostationary and/or geosynchronous (GEO) satellite, a MEO satellite, a LEO satellite, a high-altitude platform systems (HAPS), unmanned aerial vehicles (UAV), aircraft, or any other vehicle travelling in the earth's atmosphere, orbiting in outer space, and the like. The positioning data for NTN positioning may also include the movement trajectory of an NTN node; the minimum, typical, and/or maximum number of NTN nodes in range or sight of a UE; the functionalities location management component (LMC); network architecture information, such as whether the NTN system is implemented as a RPA or a TPA model; as well as the minimum, average, and/or maximum propagation delays and/or response times. The LMF may implement NTN entity configuration and positioning processes based on the received positioning data. Similarly, NG-RAN request-response signaling may be configured for capability exchange among the location server that implements the LMF, an NTN node (e.g., a satellite), a gateway node, and/or UE. As similar above, the signaling data may include the type of NTN architecture; the location management component (LMC) functionalities; a minimum, typical, or maximum number of NTN nodes in range of a target UE; a minimum, average, or maximum propagation delay and/or response time; and any other type of positioning data.

Aspects of the present disclosure include configuration, adaptation, and/or enhancements of NG-RAN signaling in an NTN. The enhanced signaling may take into account any type of NTN entity and the associated configuration data for the entity. As described herein, an NTN entity may also be referred to as any type of non-terrestrial station (NTS), which may be any type of TRPs (which may be onboard geostationary and/or geosynchronous (GEO) satellites), MEO satellites, LEO satellites, high-altitude platform systems (HAPS), unmanned aerial vehicles (UAV), aircraft, or any other vehicle travelling in the earth's atmosphere, orbiting in outer space, and similar type entities. Any entity referred to as a NTS in the present disclosure may be referring to a satellite, satellite node, network node, NG-RAN node, NT-TRP, NTN transmission point (TP), NTN reception point (RP), and the like.

Aspects of the present disclosure are described in the context of a wireless communications system. Aspects of the present disclosure are further illustrated and described with reference to device diagrams and flowcharts that relate to positioning capability data exchange in an NTN.

FIG. 1 illustrates an example of a wireless communications system 100 that supports positioning capability data exchange in an NTN in accordance with aspects of the present disclosure. The wireless communications system 100 may include one or more base stations 102, one or more UEs 104, a core network 106, and one or more non-terrestrial stations (NTSs) 108, such as satellite access nodes. The wireless communications system 100 may support various radio access technologies. In some implementations, the wireless communications system 100 may be a 4G network, such as a LTE network or an LTE-A network. In some other implementations, the wireless communications system 100 may be a 5G network, such as a NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNB, a gNB, or other suitable terminology. A base station 102 and a UE 104 may communicate via a communication link 110, which may be a wireless or wired connection. For example, a base station 102 and a UE 104 may perform wireless communication over a NR-Uu interface. The one or more NTSs 108 described herein may be or include any type of TRPs (which may be onboard geostationary and/or geosynchronous satellites), MEO satellites, LEO satellites, HAPS, UAV, aircraft, or any other vehicle travelling in the earth's atmosphere, orbiting in outer space, and the like. Any entity referred to as a NTS in the present disclosure may be referring to a satellite, a satellite access node, NTN node, NG-RAN node, NT-TRP, NTN TP, NTN RP, and similar type entities. A NTS 108 and a UE 104 may communicate via a communication link 112, which may be a wireless connection via a transmission beam and/or a reception beam.

A base station 102 and/or a NTS 108 may provide a geographic coverage area 114 for which the base station 102 and/or NTS 108 may support services (e.g., voice, video, packet data, messaging, broadcast, etc.) for one or more UE 104 within the geographic coverage area. For example, a base station 102 and a UE 104 may support wireless communication of signals related to services (e.g., voice, video, packet data, messaging, broadcast, etc.) according to one or multiple radio access technologies. Similarly, a NTS 108 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite associated with an NTN. In some implementations, different geographic coverage areas 114 associated with the same or different radio access technologies may overlap, and different geographic coverage areas 114 may be associated with different base stations 102 and/or with different NTSs 108. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 114 of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100, such as a very small aperture terminal (VSAT), which may be connected to one or multiple other network nodes serving other UEs. In some other implementations, a UE 104 may be mobile in the wireless communications system 100, such as an earth station in motion (ESIM).

The one or more UEs 104 may be devices in different forms or having different capabilities. A UE 104 may be capable of communicating with various types of devices, such as the base stations 102, other UEs 104, NTSs 108, or network equipment (e.g., the core network 106, a relay device, a gateway device, an integrated access and backhaul (IAB) node, a location server that implements the LMF, or other network equipment). Additionally, or alternatively, a UE 104 may support communication with other base stations 102 or UE 104, which may act as relays in the wireless communications system 100.

A UE 104 may also support wireless communication directly with other UE 104 over a communication link 116. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 116 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 118 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 and/or NTSs 108 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as a radio heads, smart radio heads, gateways, TRPs, and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

In at least one implementation, one or more of the UEs 104, the base stations 102, and/or one or more of the NTSs 108 are operable to implement various aspects of positioning capability data exchange in an NTN, as described herein. For instance, leveraging the described techniques, a UE 104 is operable to communicate with a NTS 108 to facilitate wireless communications. The positioning processes in an NTN take into account several different considerations than those for typical TN positioning, such as the longer propagation delays, moving satellites in the case of LEO and/or MEO satellite systems, larger pathloss, uncertainty about the number of satellites in range at any particular moment, and so on. The positioning processes in an NTN also utilizes different and/or additional positioning data than for TN positioning. In aspects of the disclosure, signaling according to the new radio positioning protocol A (NRPPa) is implemented to accommodate positioning processes in an NTN. The positioning processes are initiated by NG-RAN signaling among various network entities, such as transmit-receive points (TRPs) and the location server that implements the LMF in the core network (5GCN). The described NTN positioning enables the configuration, processing, measurement, and reporting features for RAT-dependent positioning processes to accommodate UE connected to the NTN.

With reference to terrestrial networks (TNs), the 3GPP (release 17) defines the positioning performance requirements. For example, the positioning error requirement for end-to-end latency for a position estimate of a UE in a commercial use case is less than 100 ms, and in an IIoT use case is less than 100 ms, within the order of 10 ms being desired. However, these positioning performance requirements do not take into account the latency experienced in an NTN, and do not address obtaining a position estimate for a UE given the extended propagation delays, such as for signaling and communications between a UE and a NTS (e.g., a satellite).

In aspects of positioning capability data exchange in an NTN, various RAT-dependent positioning techniques (also referred to as positioning methods, or positioning procedures) are supported for a UE, for UE assisted, LMF-based, and/or for NG-RAN node assisted. Additionally, various RAT-independent positioning techniques, such as network-assisted global navigation satellite system (GNSS) methods, may also be utilized separately or in combination with the described RAT-dependent positioning techniques to determine the location of a UE. The RAT-dependent positioning techniques that are supported include downlink-time difference of arrival (DL-TDOA), downlink-angle of departure (DL-AoD), multi-round trip time (multi-RTT), new radio enhanced cell-ID (NR E-CID); uplink-time difference of arrival (UL-TDOA); and uplink-angle of arrival (UL-AoA).

The DL-TDOA positioning technique utilizes at least three network nodes for positioning based on triangulation. The DL-TDOA positioning method makes use of the downlink reference signal time difference (RSTD) (and optionally DL PRS RSRP) of downlink signals received from multiple transmission points (TPs) at the UE. The UE measures the downlink RSTD (and optionally DL PRS RSRP) of the received signals using assistance data received from the positioning server (also referred to herein as the location server), and the resulting measurements are used along with other configuration information to locate the UE in relation to the neighboring TPs. In terms of 2D localization, three or more network nodes are required, while in the case of 3D location estimation, four or more network nodes are desirable, where nodes are TPs.

The DL-AoD positioning technique makes use of the measured downlink PRS reference signal received power (RSRP) (DL PRS RSRP) of downlink signals received from multiple TPs at the UE. The UE measures the DL PRS RSRP of the received signals using assistance data received from the positioning server (also referred to herein as the location server), and the resulting measurements are used along with other configuration information to locate the UE in relation to the neighboring TPs. The location estimate accuracy of the DL-AoD technique will also improve for N≥1 nodes.

The multi-RTT positioning technique makes use of the UE Rx-Tx measurements and DL PRS RSRP of downlink signals received from multiple TRPs, as measured by the UE and the measured gNB Rx-Tx measurements and uplink sounding reference signal (SRS) RSRP (UL SRS-RSRP) at multiple TRPs of uplink signals transmitted from UE. The UE measures the UE Rx-Tx measurements (and optionally DL PRS RSRP of the received signals) using assistance data received from the positioning server (also referred to herein as the location server), and the TRPs the gNB Rx-Tx measurements (and optionally UL SRS-RSRP of the received signals) using assistance data received from the positioning server. The measurements are used to determine the RTT at the positioning server, which are used to estimate the location of the UE. The location estimate accuracy of the multi-RTT positioning technique will also improve for N≥1 nodes.

For the NR E-CID positioning technique, the position of a UE is estimated with the knowledge of its serving next generation evolved NodeB (ng-eNB), gNB and cell, and is based on LTE signals. The information about the serving next generation evolved NodeB (ng-eNB), gNB and cell may be obtained by paging, registration, or other methods. The NR enhanced cell-ID (NR E-CID) positioning refers to techniques which use additional UE measurements and/or NR radio resources and other measurements to improve the UE location estimate using NR signals. Although enhanced cell-ID (E-CID) positioning may utilize some of the same measurements as the measurement control system in the radio resource control (RRC) protocol, the UE may not make additional measurements for the sole purpose of positioning (i.e., the positioning procedures do not supply a measurement configuration or measurement control message, and the UE reports the measurements that it has available rather than being required to take additional measurement actions).

The UL-TDOA positioning technique makes use of the uplink time difference of arrival (UL-TDOA) (and optionally UL SRS-RSRP) at multiple reception points (RPs) of uplink signals transmitted from UE. The RPs measure the UL-TDOA (and optionally UL SRS-RSRP) of the received signals using assistance data received from the positioning server, and the resulting measurements are used along with other configuration information to estimate the location of the UE. The location estimate accuracy of the UL-TDOA technique will also improve for N≥3 nodes.

The UL-AoA positioning technique makes use of the measured azimuth and the zenith of arrival at multiple RPs of uplink signals transmitted from UE. The RPs measure azimuth-AoA and zenith-AoA of the received signals using assistance data received from the positioning server (also referred to herein as the location server), and the resulting measurements are used along with other configuration information to estimate the location of the UE. The location estimate accuracy of the UL-AoA technique will also improve for N≥1 nodes.

With regard to positioning measurements and reference signals, a PRS that is transmitted on the downlink from a NTS can be locally associated with a PRS resource ID and resource set ID for a base station (e.g., TRP). Similarly, UE positioning measurements, such as RSTD and PRS RSRP measurements are made between beams (e.g., between a different pair of downlink positioning reference signal (DL PRS) resources or DL PRS resource sets) as opposed to different cells, as was the case in LTE. There are additional uplink positioning methods that a network can utilize to compute the location of a target UE. Tables T1 and T2 show the reference signal to measurements mapping for each of the supported RAT-dependent positioning techniques at the UE and gNB, respectively.

TABLE T1

UE measurements to enable RAT-dependent positioning techniques

| DL/UL Reference Signals | UE Measurements | To facilitate support of the positioning techniques |
|---|---|---|
| Rel.16 DL PRS | DL RSTD | DL-TDOA |
| Rel.16 DL PRS | DL PRS RSRP | DL-TDOA, DL-AoD, Multi-RTT |
| Rel.16 DL PRS/Rel.16 SRS for positioning | UE Rx-Tx time difference | Multi-RTT |
| Rel.15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | NR E-CID |

TABLE T2 gNB measurements to enable RAT-dependent positioning techniques

| DL/UL Reference Signals | gNB Measurements | To facilitate support of the positioning techniques |
|---|---|---|
| Rel.16 SRS for positioning | UL RTOA | UL-TDOA |

TABLE T2-continued gNB measurements to enable RAT-dependent positioning techniques

| DL/UL Reference Signals | gNB Measurements | To facilitate support of the positioning techniques |
|---|---|---|
| Rel.16 SRS for positioning | UL SRS-REFERENCE SIGNAL RECEIVED POWER (RSRP) | UL-TDOA, UL-AoA, Multi-RTT |
| Rel.16 SRS for positioning, Rel.16 DL PRS | gNB Rx-Tx time difference | Multi-RTT |
| Rel.16 SRS for positioning | AoA and ZoA | UL-AoA, Multi-RTT |

The RAT-dependent positioning techniques may utilize the 3GPP RAT and core network entities to perform the position estimation of the UE, which are differentiated from RAT-independent positioning techniques, which rely on GNSS, IMU sensor, WLAN, and Bluetooth technologies for performing target device (UE) positioning. These aspects of NR downlink-based positioning are applicable, and may be extended and adapted for an NTN gNB. For example, the location server that implements the LMF is typically a component of the core network, but in aspects of the described disclosure, may be implemented with the gNB onboard a NTS, such as a satellite. In this implementation, positioning of the UE may be determined faster than if the LMF is ground-based at the core network.

FIG. 2 illustrates an example 200 of assistance data configuration (current implementation Rel-16), with respect to UE measurement and report configuration signaling applicable to downlink-based positioning techniques. In the DL-TDOA assistance data, the information element (IE) NR-DL-TDOA-ProvideAssistanceData 202 is used by the location server to provide assistance data to enable UE-assisted and UE-based NR DL-TDOA, and may also be used to provide a NR DL-TDOA positioning specific error reason.

FIG. 3 illustrates an example 300 of measurement information (current implementation Rel-16), with respect to UE measurement and report configuration signaling applicable to downlink-based positioning techniques. In the DL-TDOA measurement report, the information element (IE) NR-DL-TDOA-SignalMeasurementInformation 302 is used by the target UE to provide NR DL-TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target UE selects a reference resource per the TRP, and compiles the measurements per the TRP based on the selected reference resource.

The different downlink measurements, including DL PRS RSRP, downlink RSTD, and UE Rx-Tx time difference required for the supported RAT-dependent positioning techniques are shown in Table T3. The measurement configurations may include four (4) pair of downlink RSTD measurements performed per pair of cells, and each measurement is performed between a different pair of downlink PRS resources or resource sets with a single reference timing; and eight (8) downlink PRS reference signal received power (RSRP) measurements can be performed on different downlink PRS resources from the same cell.

TABLE T3

Downlink measurements for downlink-based positioning techniques.

DL PRS RSRP

| | |
|---|---|
| Definition | DL PRS-RSRP, is the linear average over the power contributions (in [W]) of the resource elements that carry DL PRS reference signals configured for RSRP measurements within the considered measurement frequency bandwidth.<br>For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency,<br>RRC_CONNECTED inter-frequency |

DL reference signal time difference (DL RSTD)

| | |
|---|---|
| Definition | DL reference signal time difference (DL RSTD) is the DL relative timing difference between the positioning node j and the reference positioning node i, defined as $T_{subframeRxj} - T_{subframeRxi}$,<br>Where:<br>$T_{subframeRxj}$ is the time when the UE receives the start of one subframe from positioning node j.<br>$T_{subframeRxi}$ is the time when the UE receives the corresponding start of one subframe from positioning node i that is closest in time to the subframe received from positioning node j.<br>Multiple DL PRS resources can be used to determine the start of one subframe from a positioning node.<br>For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency<br>RRC_CONNECTED inter-frequency |

UE Rx-Tx time difference

| | |
|---|---|
| Definition | The UE Rx-Tx time difference is defined as $T_{UE-RX} - T_{UE-TX}$<br>Where:<br>$T_{UE-RX}$ is the UE received timing of downlink subframe #i from a positioning node, defined by the first detected path in time.<br>$T_{UE-TX}$ is the UE transmit timing of uplink subframe #j that is closest in time to the subframe #i received from the positioning node.<br>Multiple DL PRS resources can be used to determine the start of one subframe of the first arrival path of the positioning node.<br>For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |
| Applicable for | RRC_CONNECTED intra-frequency<br>RRC_CONNECTED inter-frequency |

Figure 4:
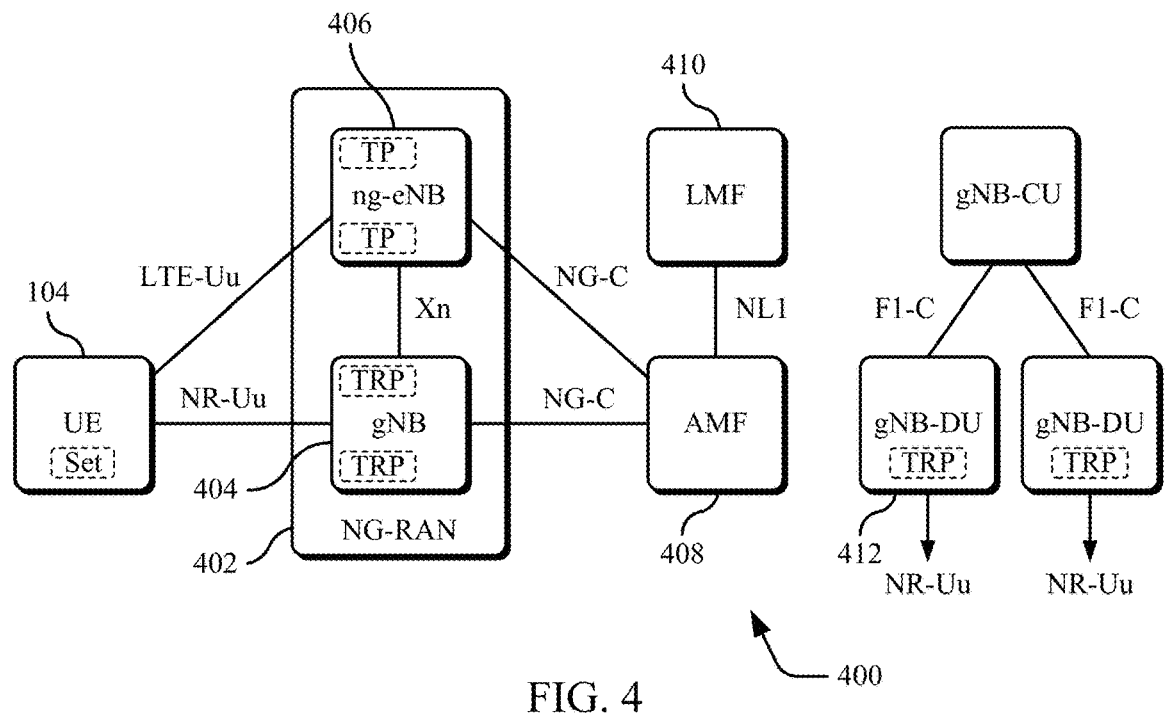
FIG. 4 illustrates an example network architecture applicable to NG-RAN for UE positioning as related to positioning capability data exchange in an NTN in accordance with aspects of the present disclosure.

FIG. 4 illustrates an example architecture 400 applicable to NG-RAN 402 for UE positioning. The NG-RAN 402 is capable of supporting both types of interfaces LTE-Uu and NR-Uu, and the gNB 404 may be implemented in an NTN architecture. The gNB 404 and an LTE next generation evolved NodeB (ng-eNB) 406 are connected by a Xn backhaul interface. The access and mobility management function (AMF) 408 may be transparent, or bypassed in an NTN architecture, and the LMF 410 provides the positioning techniques and configuration for UE positioning.

The AMF 408 may receive a request for some location service associated with a particular target UE 104 from another entity (e.g., a gateway mobile location center (GMLC) or UE), or the AMF itself decides to initiate some location service on behalf of a particular target UE, such as for an IP multimedia subsystem (IMS) emergency call from the UE. The AMF 408 then sends a location services request to the LMF 410. The LMF 410 processes the location services request which may include transferring assistance data to the target UE 104 to assist with UE-based and/or UE-assisted positioning and/or may include positioning of the target UE. The LMF 410 then returns the result of the location service back to the AMF 408 (e.g., a position estimate for the UE 104). In the case of a location service requested by an entity other than the AMF (e.g., requested by a GMLC or UE), the AMF 408 returns the location service result to this entity.

An NG-RAN node may control several TRPs and/or TPs, such as remote radio heads, or downlink PRS-only TPs for support of PRS-based terrestrial beacon system (TBS). A LMF 410 may have a proprietary signaling connection to an enhanced serving mobile location center (E-SMLC), which may enable the LMF 410 to access information from an evolved universal terrestrial radio access network (E-UTRAN) (e.g. to support the observed time difference of arrival (OTDOA) for a E-UTRA positioning method using downlink measurements obtained by a target UE of signals from next generation evolved NodeBs (ng-eNBs) and/or PRS-only TPs in E-UTRAN). A LMF 410 may have a proprietary signaling connection to a SUPL location platform (SLP). The SUPL location platform (SLP) is the secure user plane location (SUPL) entity responsible for positioning over the user plane. In the case of a split gNB architecture, a gNB-DU 412 may include TRP functionality, where the TRP functionality may support functions for a TP, RP, or both. A gNB-DU 412 that includes TRP functionality does not need to offer cell services. To support positioning of a target UE and delivery of location assistance data to a UE with NG-RAN access in 5GS, location related functions are distributed as shown in the example architecture 400.

Figure 5:
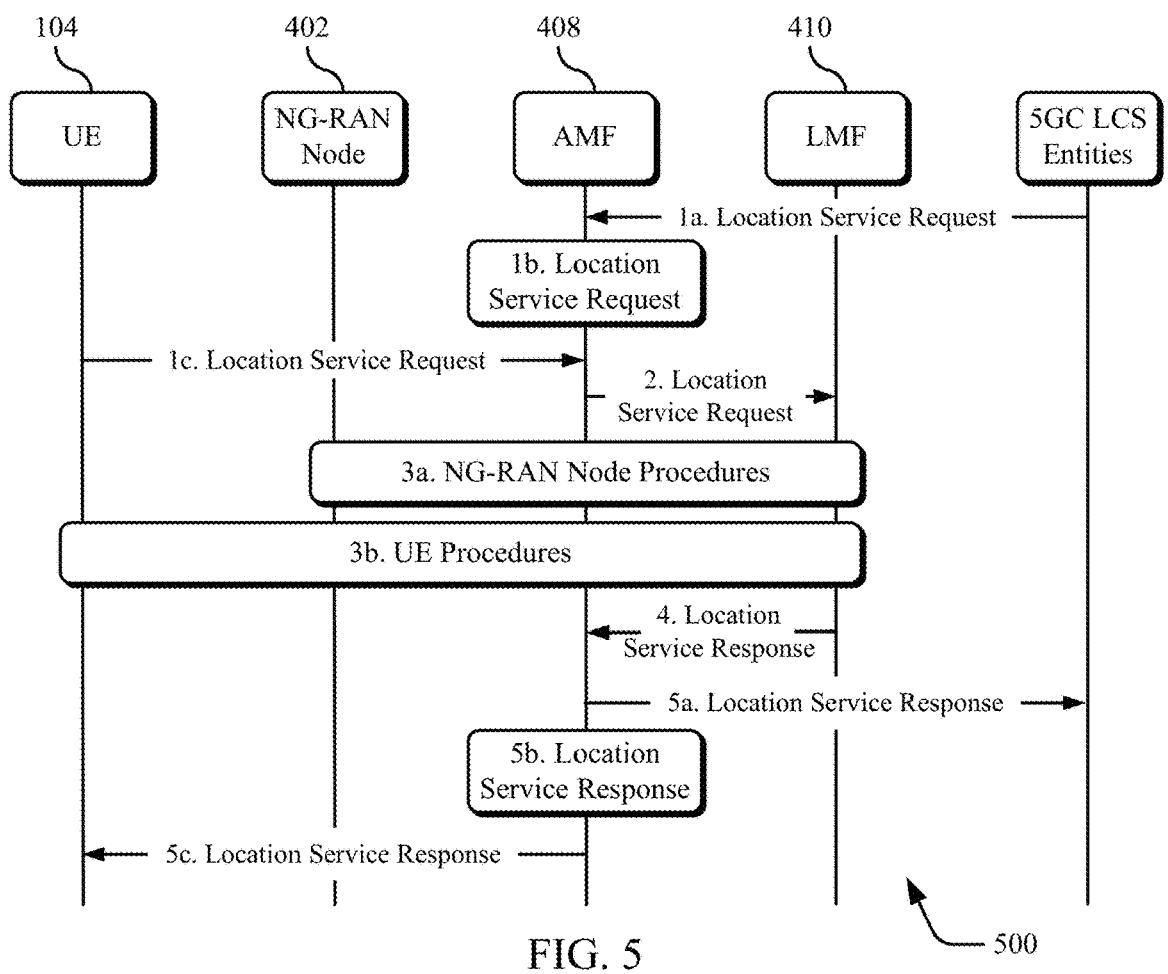
FIG. 5 illustrates an example signaling sequence applicable to NG-RAN for UE positioning as related to positioning capability data exchange in an NTN in accordance with aspects of the present disclosure.

FIG. 5 illustrates an overall sequence 500 of signaling events applicable to the UE 104, the NG-RAN 402, the AMF 408, and the LMF 410 for any location service. When the AMF 408 receives a location service request (LSR), and the UE 104 is in a connection management (CM)-idle state (CM-IDLE) state, the AMF 408 performs a network triggered service request in order to establish a signaling connection with the UE and assigns a specific serving gNB or next generation evolved NodeB (ng-eNB). The UE is assumed to be in a connected mode before the beginning of the signaling shown in the figure (i.e., signaling that may be needed to bring the UE to the connected mode prior to step 1a is not shown). However, the signaling connection may be later released, such as by the NG-RAN 402 node as a result of signaling and data inactivity while positioning is still ongoing. Additionally, the NG-RAN 402 node represents any combination of NTSs in an NTN, including a network architecture with a TN and NTN gNB, and/or a network architecture that is fully an NTN with NG-RAN architecture.

At step 1, either step 1a, step 1b, or step 1c is performed. At step 1a, an entity in the 5GC, such as a GMLC, requests a location service for positioning a target UE 104 to the serving AMF 408. Alternatively at step 1b, the serving AMF 408 for the target UE 104 determines the need for a location service (e.g. to locate the UE for an emergency call). Alternatively at step 1c, the UE 104 requests a location service, such as for the positioning or delivery of assistance data, to the serving AMF 408 at the non-access-stratum (NAS) level.

At step 2, the AMF 408 transfers the location service request to the LMF 410. At step 3a, the LMF 410 instigates location procedures with the serving and possibly neighboring next generation evolved NodeB (ng-eNB) or gNB in the NG-RAN 402, such as to obtain positioning measurements or assistance data. In addition to step 3a or alternatively (instead of step 3a), at step 3b, the LMF 410 instigates location procedures with the UE 104, such as to obtain a location estimate or positioning measurements, or to transfer location assistance data to the UE.

At step 4, the LMF 410 provides a location service response to the AMF 408 and includes any needed results, such as a success or failure indication and, if requested and obtained, a location estimate for the UE 104. At step 5a (if step 1 a was performed), the AMF 408 returns a location service response to the 5GC entity in step 1a and includes any needed results, such as a location estimate for the UE 104. At step 5b (if step 1b occurred), the AMF 408 uses the location service response received in step 4 to assist the service that triggered this in step 1b, such as to provide a location estimate associated with an emergency call to a GMLC. At step 5c (if step 1c was performed), the AMF 408 returns a location service response to the UE 104 and includes any needed results, such as a location estimate for the UE.

In aspects of positioning capability data exchange in an NTN, the location procedures applicable to NG-RAN occur in steps 3a and 3b, which supports the configurations and reporting for communication between the LMF 410 and the UE 104 to enable NTN system level positioning. The steps 3a and 3b may involve the use of different positioning methods (also referred to herein as positioning techniques or positioning procedures) to obtain location related measurements for a target UE, and from these, the UE computes a location estimate and additional positioning assistance information.

Figure 6:
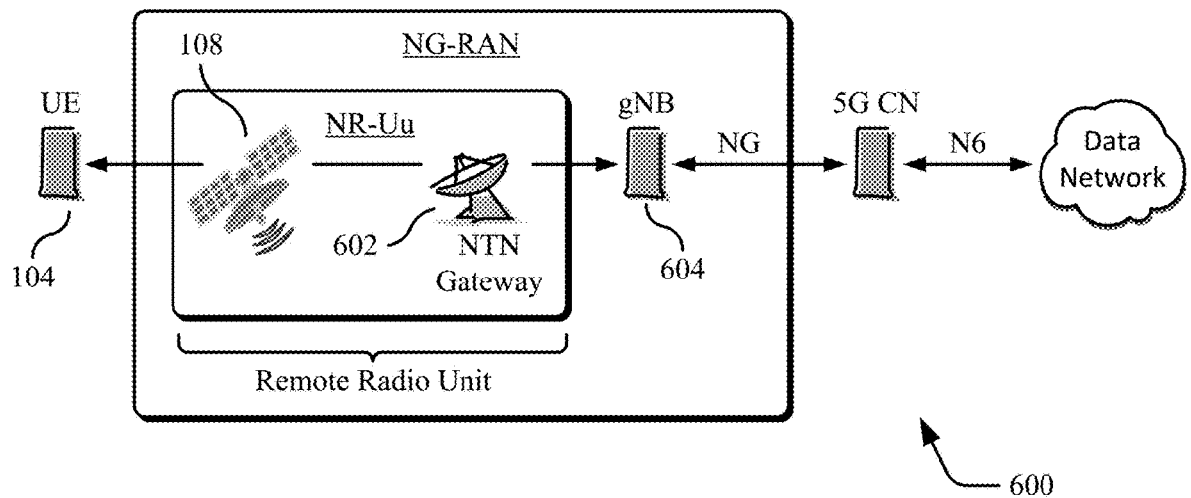
FIG. 6 illustrates an example transparent satellite-based NG-RAN architecture that supports positioning capability data exchange in an NTN in accordance with aspects of the present disclosure.

FIG. 6 illustrates a transparent satellite-based NG-RAN architecture 600. The satellite payload implements frequency conversion and a radio frequency amplifier in both the uplink and downlink directions, and it corresponds to an analogue RF repeater. Hence, the satellite (e.g., a NTS 108) repeats the NR-Uu radio interface from the feeder link, between the NTN gateway 602 and the satellite, to the service link between the satellite and the UE 104 (and vice-versa). The satellite radio interface (SRI) on the feeder link is the NR-Uu, meaning that the satellite does not terminate the NR-Uu radio interface. The NTN gateway 602 may support all of the necessary functions to forward the signal of the NR-Uu interface, and different transparent satellites may be connected to the same gNB 604 on the ground. Note that while several gNBs may access a single satellite payload, the illustration and description is simplified to the one gNB 604 accessing the satellite payload, without loss of generality.

Figure 7:
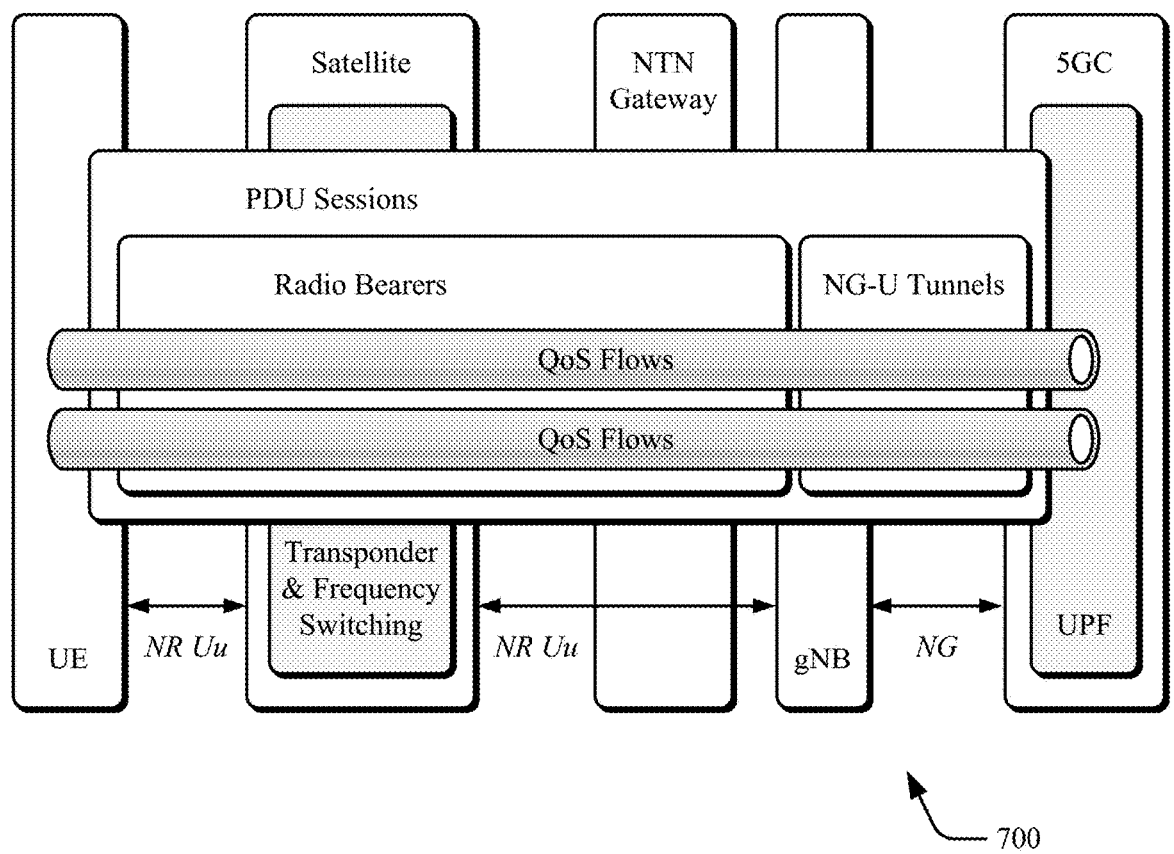
FIG. 7 illustrates an example of a transparent satellite-based NG-RAN architecture, adaptable for positioning capability data exchange in an NTN in accordance with aspects of the present disclosure.
Figure 8:
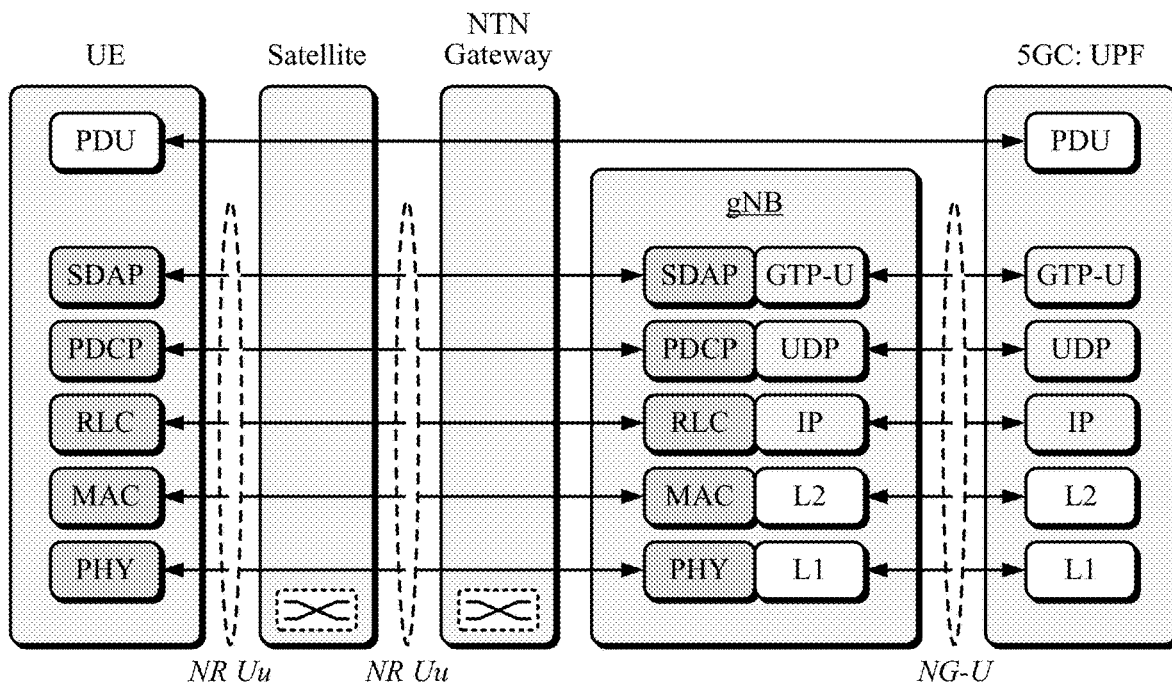
FIG. 8 illustrates an example of the UE user plane protocol stack for the transparent satellite-based NG-RAN architecture, adaptable for positioning capability data exchange in an NTN in accordance with aspects of the present disclosure.
Figure 9:
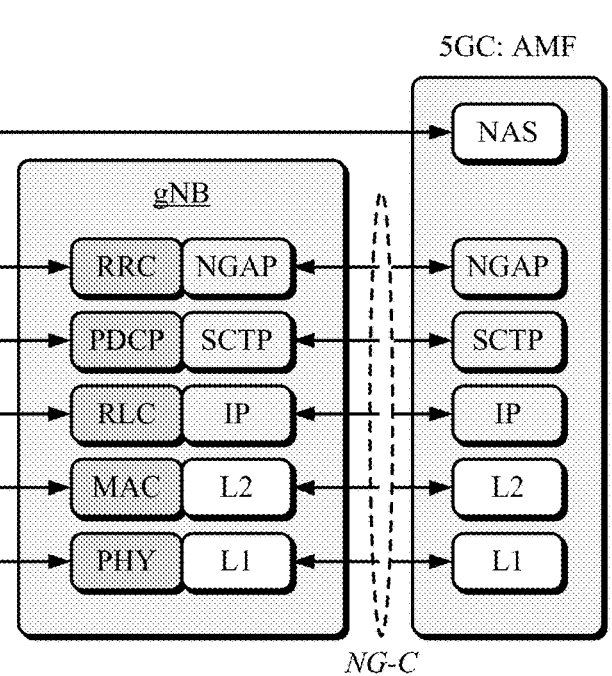
FIG. 9 illustrates an example of the control plane protocol stack for the transparent satellite-based NG-RAN architecture, adaptable for positioning capability data exchange in an NTN in accordance with aspects of the present disclosure.

FIG. 7 illustrates an example 700 of a transparent satellite-based NG-RAN architecture with mapping to quality of service (QoS) flows. The UE 104 has access to the 5G system via a 3GPP NR-based radio interface. FIG. 8 illustrates an example 800 of the UE user plane protocol stack for the transparent satellite-based NG-RAN architecture. The user data is transported between the UE 104 and the 5GC via the NTN gateway. FIG. 9 illustrates an example 900 of the control plane protocol stack for the transparent satellite-based NG-RAN architecture. The non-access stratum (NAS) (NAS-SM and NAS-MM) signaling from the UE 104 and the NG-AP signaling from the gNB are transported toward the 5GC and vice-versa.

Figure 10:
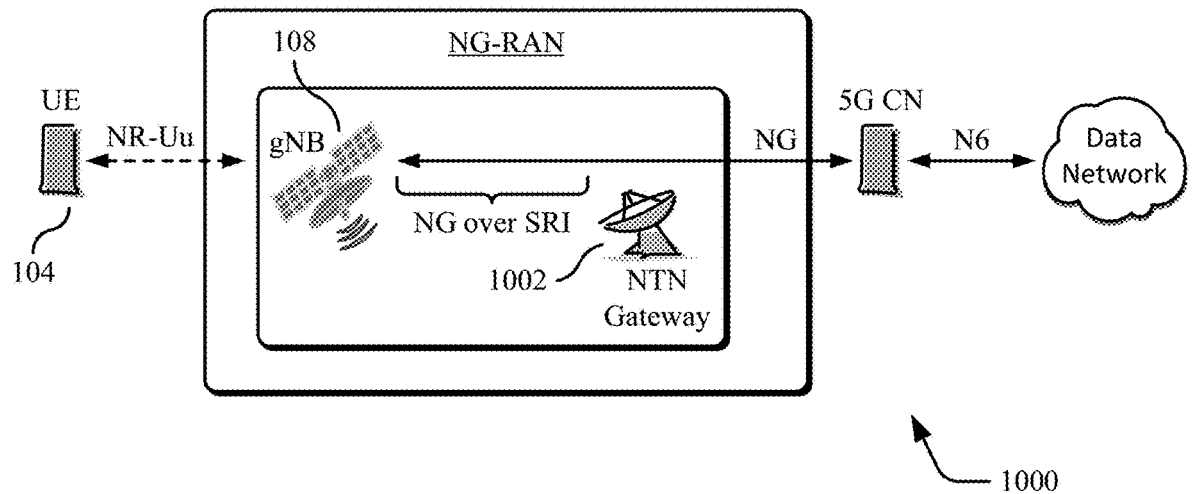
FIG. 10 illustrates an example regenerative satellite-based NG-RAN architecture that supports positioning capability data exchange in an NTN in accordance with aspects of the present disclosure.

FIG. 10 illustrates a regenerative satellite-based NG-RAN architecture 1000, such as a regenerative satellite without an inter-satellite link (ISL), and with a gNB-processed payload. The NG-RAN logical architecture may be used as baseline for an NTN. The satellite payload implements regeneration of the signals received from ground-based network nodes. In this architecture 1000, the NR-Uu radio interface is implemented on the service link between the UE 104 and the satellite (e.g., a NTS 108), and the satellite radio interface (SRI) is implemented on the feeder link between the NTN gateway 1002 and the satellite. The satellite radio interface (SRI) is a transport link between the NTN gateway 1002 and the satellite.

Figure 11:
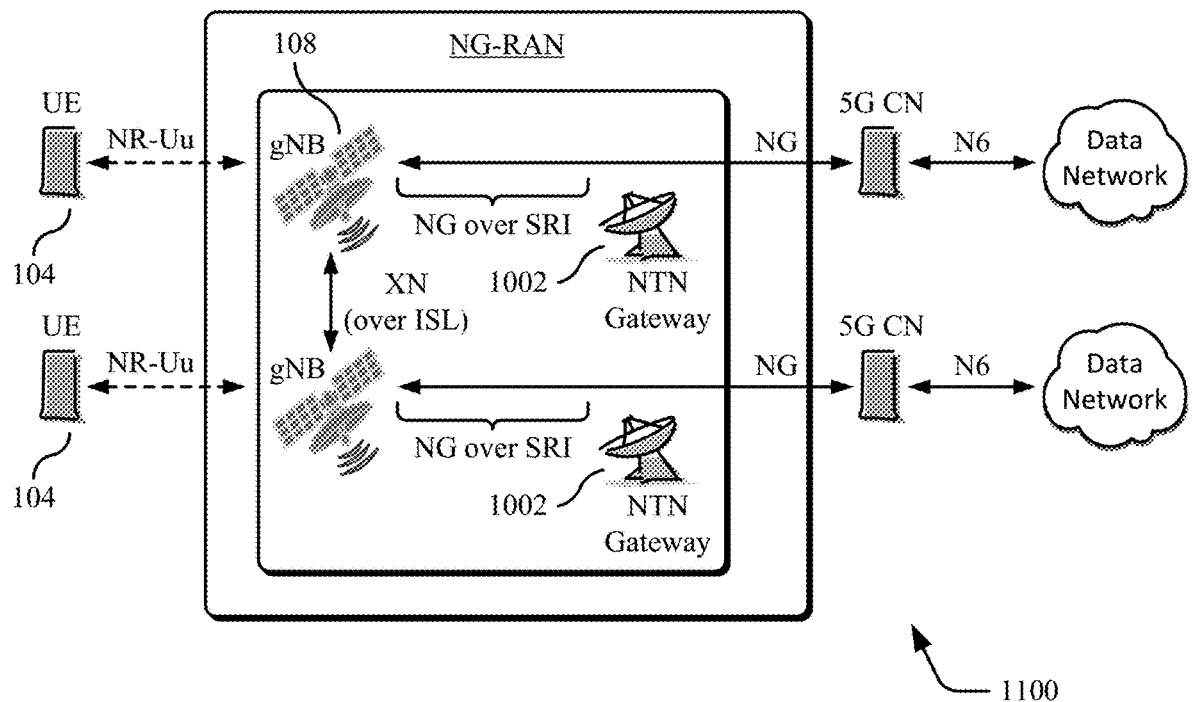
FIG. 11 illustrates another example regenerative satellite-based NG-RAN architecture that supports positioning capability data exchange in an NTN in accordance with aspects of the present disclosure.

FIG. 11 illustrates another example of a regenerative satellite-based NG-RAN architecture 1100, such as a regenerative satellite system with an inter-satellite link (ISL). The inter-satellite link (ISL) is a transport link, such as a radio interface or an optical interface, between satellites (e.g., NTSs 108). The NTN gateway 1002 is a transport network layer node, and supports all necessary transport protocols. In this architecture 1100, a UE 104 that is served by a gNB onboard a satellite could access the 5GCN via the inter-satellite link (ISL). In implementations, the gNB onboard different satellites may be connected to the same 5GCN on the ground, and if a satellite hosts more than one gNB, the same satellite radio interface (SRI) may be used to transport all the corresponding NG interface instances. In this architecture, the protocol stack of the satellite radio interface (SRI) is used to transport the UE user plane between a satellite and an NTN gateway 1002. The user protocol data units (PDUs) are transported over GTP-U tunnels between the 5GCN and the onboard gNB, via the NTN gateway 1002. The NG-AP is transported over SCTP, between the 5GCN and the onboard gNB via the NTN gateway. The NAS protocol is also transported by the NG-AP protocol, between the 5GCN and the onboard gNB, via the NTN gateway.

Figure 12:
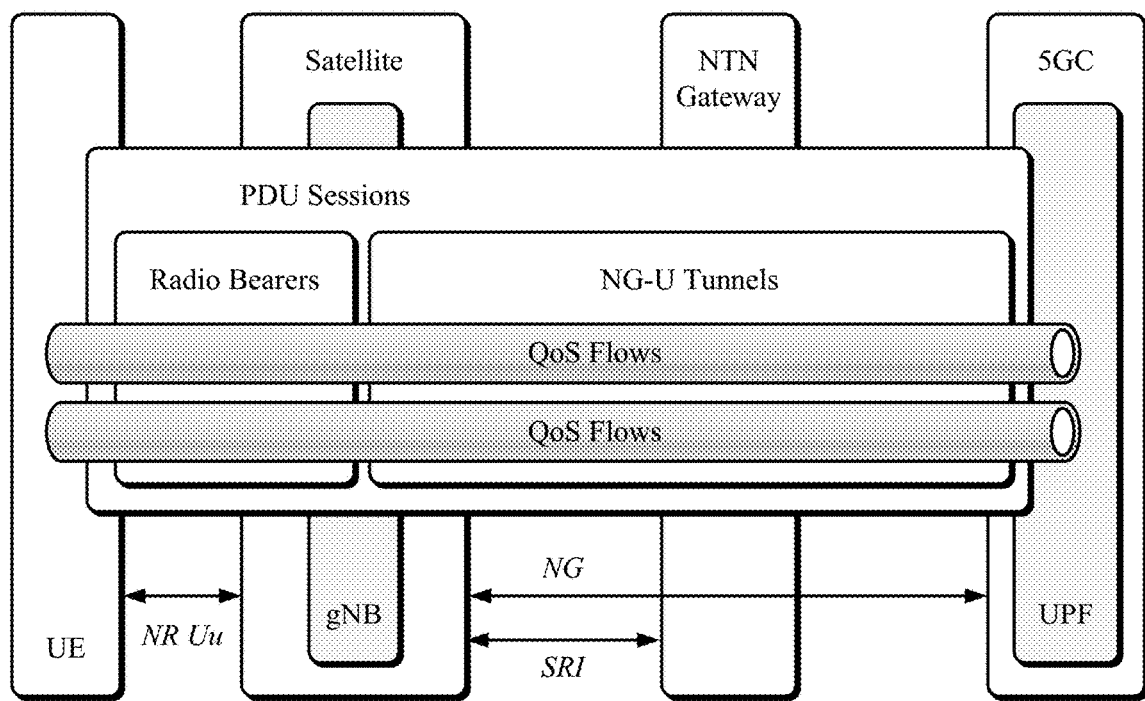
FIG. 12 illustrates an example of a regenerative satellite-based NG-RAN architecture with gNB onboard, adaptable for positioning capability data exchange in an NTN in accordance with aspects of the present disclosure.
Figure 13:
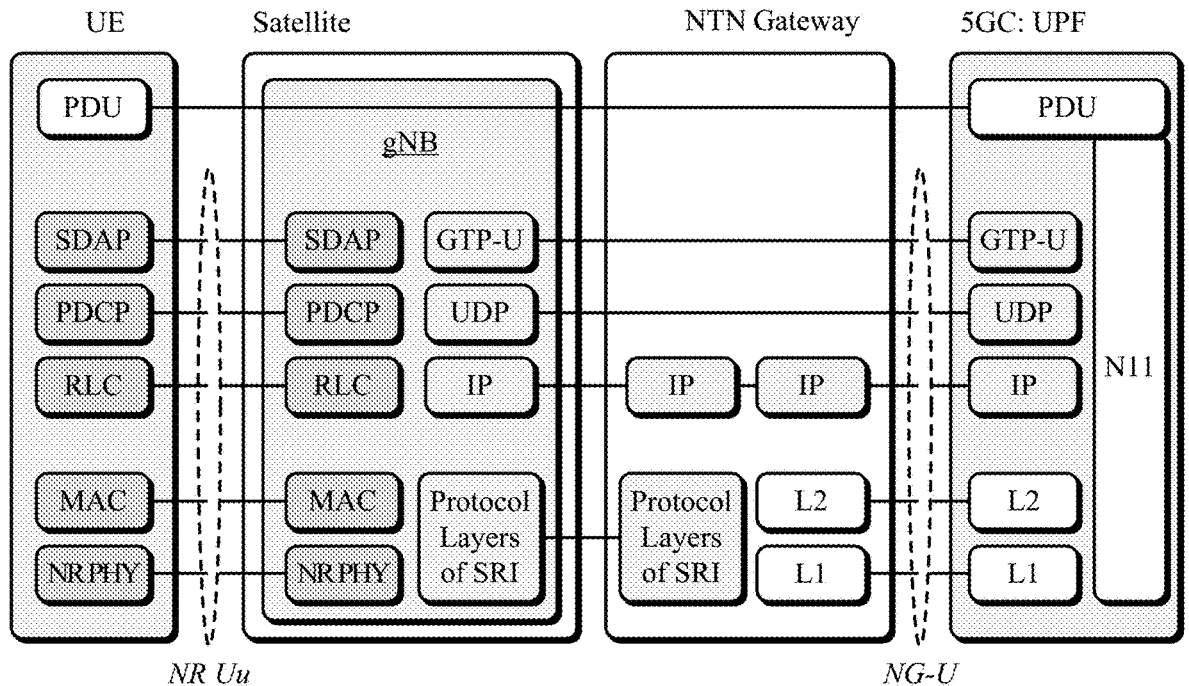
FIG. 13 illustrates an example of the UE user plane protocol stack for a protocol data unit (PDU) session, with respect to the regenerative satellite-based NG-RAN architecture with the gNB onboard, adaptable for positioning capability data exchange in an NTN in accordance with aspects of the present disclosure.
Figure 14:
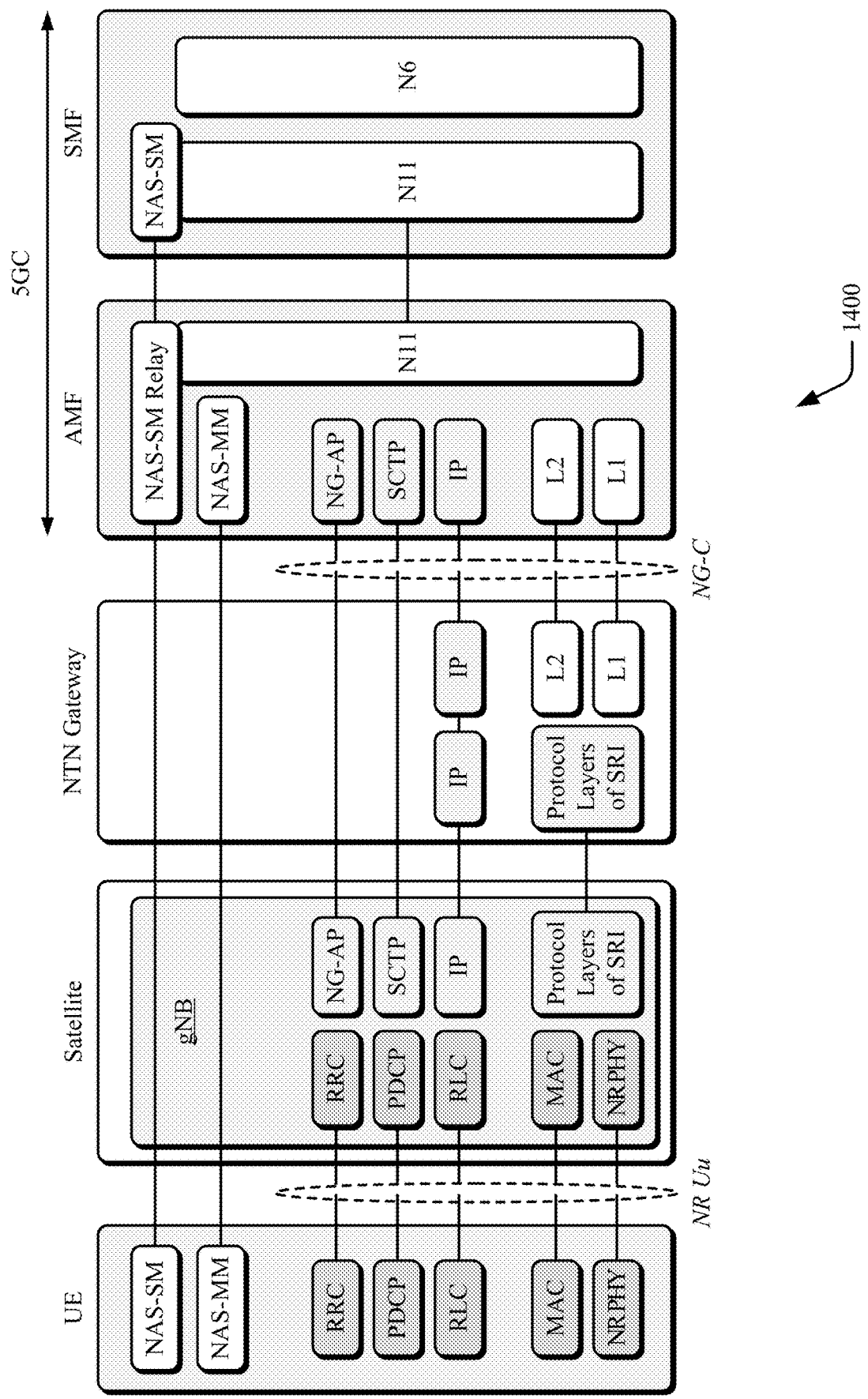
FIG. 14 illustrates an example of the UE control plane protocol stack for a PDU session, with respect to the regenerative satellite-based NG-RAN architecture with the gNB onboard, adaptable for positioning capability data exchange in an NTN in accordance with aspects of the present disclosure.

FIG. 12 illustrates an example 1200 of a regenerative satellite-based NG-RAN architecture with gNB onboard, and the quality of service (QoS) flows. FIG. 13 illustrates an example 1300 of the UE user plane protocol stack for a PDU session, with respect to the regenerative satellite-based NG-RAN architecture with the gNB onboard. The protocol stack of the satellite radio interface (SRI) is used to transport the UE user plane between the satellite and the NTN gateway. The user protocol data units (PDUs) are transported over GTP-U tunnels between the 5GC and the onboard gNB, via the NTN gateway. FIG. 14 illustrates an example 1400 of the UE control plane protocol stack for a PDU session, with respect to the regenerative satellite-based NG-RAN architecture with the gNB onboard. The NG-AP is transported over SCTP, between the 5GC and the onboard gNB, via the NTN gateway. The non-access stratum (NAS) protocol is also transported by the NG-AP protocol, between the 5GC and the onboard gNB, via the NTN gateway.

Aspects of the present disclosure include solutions for positioning capability data exchange in an NTN, such as enhancements for performing third generation partnership project (3GPP) positioning in a NR NTN NG-RAN architectural framework. As described herein, the disclosure techniques include to enable NG-RAN request-response signaling of NTN positioning capabilities between a location server (LMF) and a target UE. The disclosure techniques also include defining NG-RAN request-response signaling of NTN positioning capabilities of NTN gNBs and/or TRPs by the LMF. The disclosure techniques also include defining NG-RAN request-response signaling of NTN positioning capabilities of gateway(s) and associated NTN gNBs and/or TRPs by the LMF.

As used herein, a positioning-related reference signal may refer to a reference signal used for positioning techniques, positioning procedures, positioning methods, and/or positioning purposes to estimate a location of a target UE. A reference signal may be a PRS, or based on existing reference signals, such as a SRS. A target UE may be referred to as the UE, device, or entity to be localized and/or positioned based on a positioning determination. A UE may be referred to as a target UE or as the UE of interest, for which the positioning is to be determined or calculated by a network entity or by the UE itself.

Notably, any of the positioning techniques described in the present disclosure may be implemented in combination with any additional positioning techniques described in the related disclosures: U.S. patent application Ser. No. 17/554, 916 entitled "Positioning in a Non-Terrestrial Network" filed Dec. 17, 2021; U.S. patent application Ser. No. 17/554,583 entitled "Configuration and Reporting in a Non-Terrestrial Network" filed Dec. 17, 2021; and U.S. patent application Ser. No. 17/554,689 entitled "Signal Isolation using Polarization in a Non-Terrestrial Network" filed Dec. 17, 2021, the full disclosures of which are incorporated by reference herein in their entirety.

In aspects of capability exchange signaling, techniques are provided to exchange capability information, which may be static and/or dynamic, such as to perform RAT-dependent positioning in an NTN based on capability information exchange between a LMF and a target UE. In an implementation, the location server that implements the LMF may request the positioning capabilities of the target device (e.g., a target UE), which may be capable of receiving and processing positioning measurements configured for positioning methods supported by a particular NTN architecture.

Figure 15:
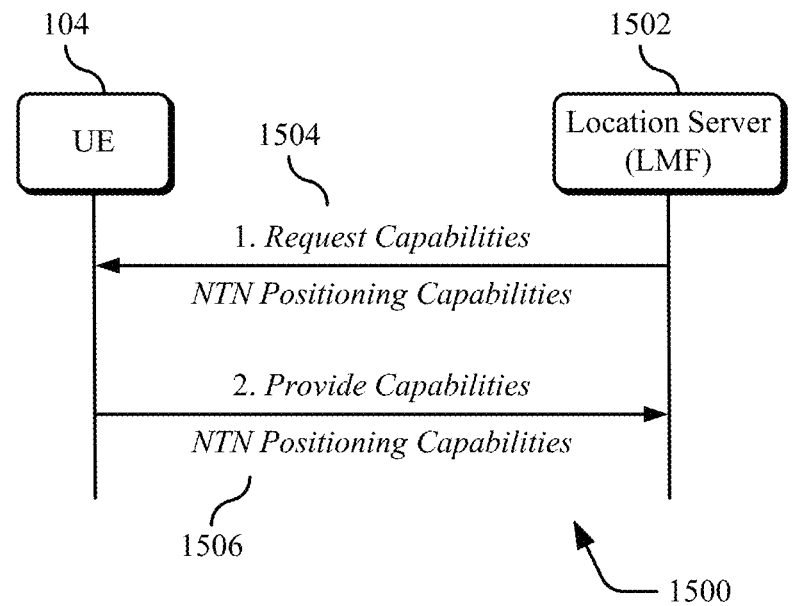
FIG. 15 illustrates an example of NTN positioning capability exchange as related to positioning capability data exchange in an NTN in accordance with aspects of the present disclosure.

FIG. 15 illustrates an example 1500 of NTN positioning capability exchange, as related to positioning capability data exchange in an NTN in accordance with aspects of the present disclosure. This example 1500 includes a location server 1502 that implements the LMF communicating with a UE 104 by network signaling. The signaling exchange between the location server 1502 and the UE 104 includes a request 1504 for NTN positioning capabilities and a response 1506 for the NTN positioning capabilities. The UE response 1506 indicates whether the UE is capable of performing positioning measurements and which associated positioning techniques it is capable of performing over the NTN.

FIG. 16 illustrates an example 1600 of the RequestCapabilities information element (IE) as related to positioning capability data exchange in an NTN in accordance with aspects of the present disclosure. This example 1600 illustrates proposed and/or augmented signaling and parameters as shown at 1602, 1604, and 1606 for NTN capabilities in the RequestCapabilities information element (IE).

FIG. 17 illustrates an example 1700 of ASN.1 code for the RequestCapabilities as related to positioning capability data exchange in an NTN in accordance with aspects of the present disclosure. This example 1700 illustrates an alternative implementation, with the NTN positioning capabilities signaled at 1702 within the positioning capabilities information element (IE). The capabilities requested and reported for positioning through an NTN may be associated with capabilities for positioning through a ground TN system and/or based on enhanced positioning methods, such as described in the related disclosures incorporated above. For example, the capability to receive one or more positioning reference signals from different polarization types may be reported to the LMF. Further, the measurement report and/or location estimate response times for an NTN may be supported as a UE feature and/or capability reported to the LMF.

In aspects of capability exchange signaling, techniques may also be implemented for the LMF to determine the NTN positioning capabilities of a NG-RAN node operating as a non-terrestrial network entity. Examples of such entities are transmit-receive points (TRPs) onboard of geostationary or geosynchronous (GEO) satellites, MEO satellites, LEO satellites, high-altitude platform systems (HAPS), unmanned aerial vehicles (UAV), aircraft, or any other vehicle travelling in the earth's atmosphere, orbiting in outer space, and the like (also referred to herein as a NTS). Notably, any entity in the present disclosure may be referred to as an NTN entity, a NTS, satellite, satellite node, network node, NG-RAN node, a non-terrestrial transmit-receive point (NT-TRP), NTN node, NTN transmit point (TP), NTN receive point (RP), and the like. Making a reference to one such entity does not limit the scope of the disclosure.

Figure 18:
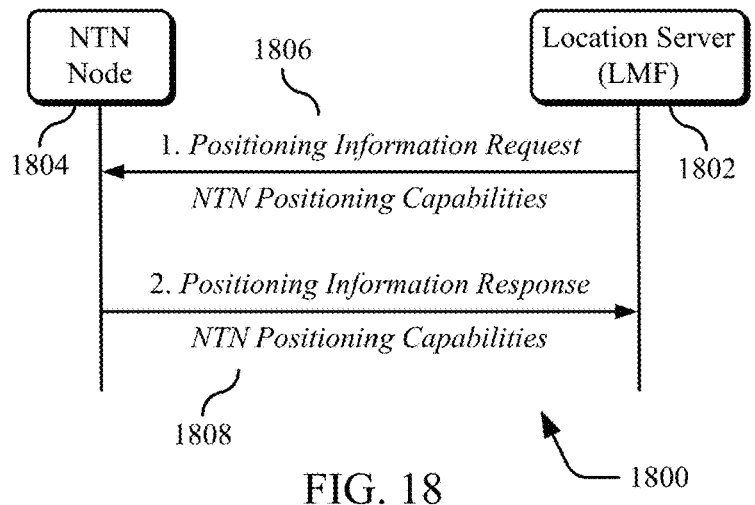
FIG. 18 illustrates an example of a signaling exchange as related to positioning capability data exchange in an NTN in accordance with aspects of the present disclosure.

FIG. 18 illustrates an example 1800 of a signaling exchange as related to positioning capability data exchange in an NTN in accordance with aspects of the present disclosure. This example 1800 includes a location server 1802 that implements the LMF communicating with an NTN node (e.g., a NTS 108) by network signaling, such as for NTN capability validation with a NG-RAN node functioning as a satellite entity using positioning information response signaling. The signaling exchange between the location server 1802 and the NTN node 1804 includes a request 1806 for NTN positioning capabilities and a response 1808 for the NTN positioning capabilities. The LMF 1802 may request information related to the NTN positioning capabilities of the NTN node 1804 in order to determine the positioning capabilities, such as the type of NTN node and positioning capabilities (e.g., uplink positioning capabilities).

Figure 19:
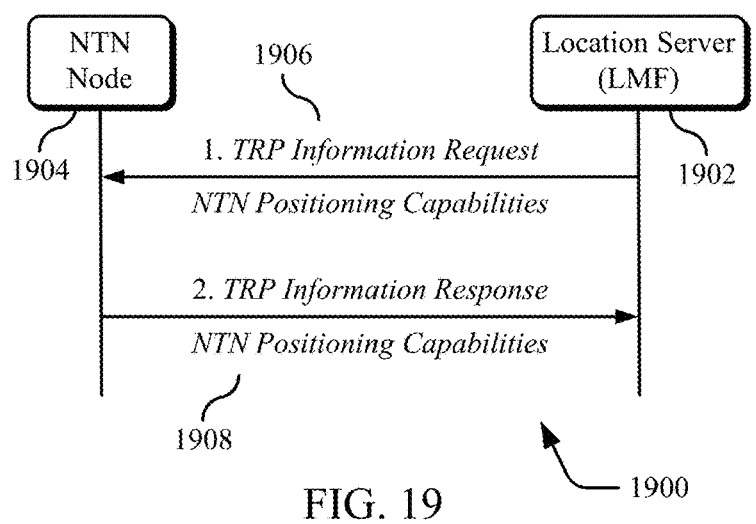
FIG. 19 illustrates another example of a signaling exchange as related to positioning capability data exchange in an NTN in accordance with aspects of the present disclosure.

FIG. 19 illustrates another example 1900 of a signaling exchange as related to positioning capability data exchange in an NTN in accordance with aspects of the present disclosure. This example 1900 includes a location server 1902 that implements the LMF communicating with an NTN node (e.g., a NTS 108) by network signaling, such as for NTN capability validation with a NG-RAN node functioning as a satellite entity using TRP information response signaling. The signaling exchange between the location server 1902 and the NTN node 1904 includes a TRP information request 1906 for NTN positioning capabilities and a TRP information response 1908 for the NTN positioning capabilities. Examples of the type of NTN node 1904 that may be indicated in the positioning information signaling or TRP information signaling may include a geostationary or geosynchronous (GEO) satellite, a MEO satellite, a LEO satellite, high-altitude platform systems (HAPS), unmanned aerial vehicles (UAV), aircraft, or any other type of NTS.

The LMF may recognize any of these types of an NTN node according to specification or implementation. Accordingly, the LMF may configure a positioning process based on the type of the NTN node. For example, if a satellite is geostationary, it may be used for a positioning process, and functions based on a static relative location to the earth. However, if a satellite is geosynchronous, but not geostationary, it may not be suitable for such positioning methods. If the relative movement of a geosynchronous satellite is relatively small with respect to earth coordinates, such as below a threshold, the satellite may still be used for positioning by a LMF configuration.

If a satellite is a LEO or MEO type of satellite, the LMF may use the satellite for a positioning process that does not depend on the TRP being static relative to earth coordinates. However, the configuration by the LMF may depend on any one or combination of the trajectory of the movement of the satellite (e.g., satellite ephemeris, nominal orbit, actual orbit., etc.), the number of satellites in the system (constellation), a minimum number of satellites in range or in sight of any point on earth, a minimum number of satellites in range or in sight of any point in the approximate area or vicinity of a target UE, a maximum number of satellites in range or in sight of any point on earth, a maximum number of satellites in range or in sight of any point in the approximate area or vicinity of a target UE, a typical, average, or expected number of satellites in range or in sight of any point on earth, and/or a typical, average, or expected number of satellites in range or in sight of any point in the approximate area or vicinity of a target UE.

In some examples, if the NTN node is a LEO satellite or a MEO satellite, and/or the NTN node travels in an orbit or in any other predictable trajectory, and/or the NTN node travels at a speed higher than a threshold, then the LMF may use the NTN node to configure a positioning process based on, or assisted by, Doppler frequency measurements, such as described in the related disclosures incorporated above. If the NTN node is a HAPS node, a UAV, or an aircraft, then the LMF may configure a positioning process in which the NTN node is not static relative to the earth coordinates, nor does it have a nominal orbit or a predictable movement trajectory.

In any of the implementations, the LMF may not configure a positioning process if the NTN positioning capabilities indicated by the proposed capability signaling from the NTN node are incompatible with the positioning capabilities indicated by the UE. For example, if a satellite is a type of geostationary or geosynchronous (GEO) satellite, but the UE is not capable of communicating at a signal strength (such as indicated by a RSRP, for example) as low as what is provided the geostationary or geosynchronous (GEO) satellite, then the LMF may not configure a positioning process for the UE based on signaling with the GEO satellite. If a satellite is of a LEO or MEO type, then the LMF may configure a positioning process for a UE based on any one or combination of a number of satellites in the system (constellation) is equal to or larger than a threshold associated with the positioning process and/or UE capabilities; a minimum and/or maximum and/or typical, average, or expected number of satellites in range or in sight of any point on earth and/or any point in the approximate area or vicinity of the UE is equal to or larger than a threshold associated with the positioning process and/or the UE capabilities; or the UE is capable of performing Doppler-assisted positioning. Further, if the NTN node is a HAPS node, a UAV, or an aircraft, the LMF may configure a positioning process for the UE if the process is supported by the UE, as indicated in the capability signaling from the UE, and the process does not involve the NTN node needing to be static relative to the earth coordinates, nor is the NTN node needed to follow a nominal orbit or a predictable movement trajectory.

As described above, the LMF may configure a positioning process for a target UE by a satellite node based on determining whether the number of satellite nodes, as indicated by the network or a network node, is sufficient for the positioning process. For example, if a positioning process is based on a DL-TDOA method, a minimum of three NTN nodes may be utilized for a correct estimation of the position. If a positioning process is based on a multi-RTT method, a minimum of one node may be utilized, although the accuracy improves with a larger number of network nodes. If a positioning process is based on a DL-AoD method, a minimum of one node may be utilized for a correct estimation of the position.

In the various implementations, the number of network nodes may vary from one implementation to another, which may be indicated by a specification or signaling (such as a capability of the target UE signaled to the LMF), or determined according to an implementation. In some respects, a number of network nodes may be a factor as to the accuracy of a positioning method, and the LMF may determine whether to configure a positioning process, taking into account the accuracy for a location-based service, the processing or other capabilities of the target UE as indicated in a capability signaling to the LMF, and/or based on other factors.

Alternatively or in addition, a network entity, such as a non-terrestrial transmit-receive point (NT-TRP) or a gateway, may indicate capability information that includes any one or combination of: a minimum, expected, average, or typical, and/or maximum number of network nodes in range or in sight of the UE, or an approximate area or vicinity of the UE; a minimum, expected, average, or typical, and/or maximum number of network nodes in range or in sight of the UE, or an approximate area or vicinity of the UE, which may be configured for any positioning process or for a particular positioning process; a minimum, expected, average, or typical, and/or maximum distance between a UE and a serving network node; a minimum, expected, average, or typical, and/or maximum propagation delay between a UE and a serving network node; a distributed location management component (LMC) functionality provided by the NTN or a network entity associated with the NTN; a location management component (LMC) functionality provided by the gateway, a gNB-central unit (CU), a gNB satellite, and/or a gNB-DU satellite; network architecture information, such as whether the NTN, an NTN node, an NTN link, etc. is based on a regenerative-payload architecture (RPA) or a TPA; information related to Doppler frequency measurements (e.g., a center frequency accuracy (in ppm) for Doppler-based/assisted methods); and/or a minimum, expected, average, or typical, and/or maximum response time for location measurement reporting, which may depend on various factors and parameters such as a minimum, expected, average, or typical, and/or maximum propagation delay between a UE and a serving network node, a number of hops (e.g., inter-satellite links (ISLs)), and the like.

In some implementations, upon receiving information of a minimum number of network nodes in range or in sight of the UE, the LMF may configure an NTN positioning method based on the minimum number of the network nodes. For example, if the minimum number of network nodes is equal to one (1), then the LMF may configure a positioning process that is operable with one node, such as DL-AoD, multi-RTT, and the like. Alternatively, if the minimum number of network nodes is equal to two (2), the LMF may configure a positioning process that is operable with two nodes, such as DL-AoD, multi-RTT, and the like. If the minimum number of network nodes is equal to three (3) or more nodes, then the LMF may configure a positioning process that is operable with three or more nodes, such as DL-TDOA.

Alternatively, the LMF may provide information to another network entity, such as a CU, to configure a positioning process based on the minimum number of network nodes. A similar process may be employed for an expected, average, or typical number of satellite gNBs, or a maximum number of satellite gNBs, upon receiving information of the expected, average, or typical number of network nodes, respectively. In some implementations, the LMF and/or a CU may further take into account a minimum, expected, average, typical, and/or maximum number of ground TN gNBs in range or in sight for the UE in addition to the minimum, expected, average, typical, and/or maximum number of satellite gNBs in range or in sight for the UE in order to configure an NTN positioning method for the UE.

In various examples, if the minimum number of satellite gNBs plus the minimum number of ground gNBs is equal to one (1), then the LMF and/or CU may configure a positioning process that may be operable with one node. If the minimum number of satellite gNBs plus the minimum number of ground gNBs is equal to two (2), then the LMF and/or CU may configure a positioning process that is operable with two nodes. If the minimum number of satellite gNBs plus the minimum number of ground gNBs is equal to three (3) or more, then the LMF and/or CU may configure a positioning process that is operable with three or more nodes.

If the expected, average, or typical number of satellite gNBs plus the expected, average, or typical number of ground gNBs is equal to (one) 1, then the LMF and/or CU may configure a positioning process that is operable with one node. If the expected, average, or typical number of satellite gNBs plus the expected, average, or typical number of ground gNBs is equal to two (2), then the LMF and/or CU may configure a positioning process that is operable with two nodes. If the expected, average, or typical number of satellite gNBs plus the expected, average, or typical number of ground gNBs is equal to three (3) or more, then the LMF and/or CU may configure a positioning process that is operable with three or more nodes.

If the maximum number of satellite gNBs plus the maximum number of ground gNBs is equal to one (1), then the LMF and/or CU may configure a positioning process that is operable with one node. If the maximum number of satellite gNBs plus the maximum number of ground gNBs is equal to two (2), then the LMF and/or CU may configure a positioning process that is operable with two nodes. If the maximum number of satellite gNBs plus the maximum number of ground gNBs is equal to three (3) or more, the LMF and/or CU may configure a positioning process that is operable with three or more nodes.

A mix-and-match approach to combining the number of satellite gNBs and ground gNBs is not precluded. In another implementation, the LMF and/or CU may employ a similar method for a minimum or expected number of satellite gNBs in range or in sight of the UE to perform NTN-based positioning. In various implementations, the LMF and/or CU may additionally take into account a number of ground gNBs.

Figure 20:
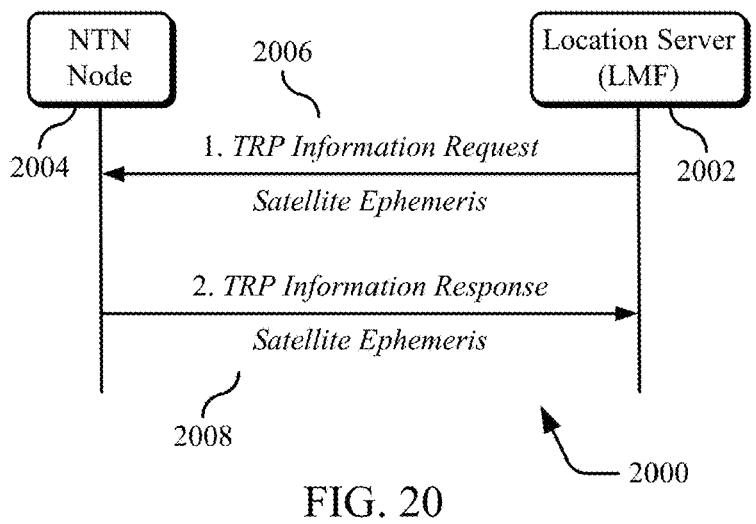
FIG. 20 illustrates another example of a signaling exchange as related to positioning capability data exchange in an NTN in accordance with aspects of the present disclosure.

FIG. 20 illustrates an example 2000 of a signaling exchange as related to positioning capability data exchange in an NTN in accordance with aspects of the present disclosure. This example 2000 includes a location server 2002 that implements the LMF communicating with NTN node (e.g., a NTS 108) by network signaling, such as for request-response signaling with the satellite to obtain satellite ephemeris information for configuring a positioning process. The signaling exchange between the location server 2002 and the NTN node 2004 includes a TRP information request 2006 for satellite ephemeris information and a TRP information response 2008 of the satellite ephemeris information. This is an alternative to obtaining information of a minimum, typical, or maximum number of satellites in range or in sight of a UE. The LMF may obtain related information by requesting the satellite ephemeris information from one or multiple satellite nodes (e.g., NTN nodes).

Then based on the ephemeris information in the response signaling from the one or multiple satellite nodes, the signal strength of each of the satellites may provide at an approximate area, region, or vicinity of the target UE, and other related information, the LMF may determine whether to configure a positioning process for a target UE through one or multiple of the probed satellites. In an example, the LMF may indicate the type(s) and quantities of ephemeris information in the request message. The type(s) and quantities of satellite ephemeris may include any one or combination of a current location of the satellite node (e.g., in 3D coordinates), an expected location of a satellite node at an indicated time (e.g., indicated in the request message), a current velocity of the satellite node (e.g., velocity in 3D coordinates), an expected velocity of the satellite node at the indicated time, a time stamp (e.g., the time stamp associated with the location and velocity information), and/or a nominal orbit for LEO and MEO satellite systems.

In response, the satellite node may send the response message with values for the type(s) and quantities of the satellite ephemeris indicated in the request message. Based in part on the information received from one or multiple satellite nodes, as well as combined with other related information, such as signal strength values (e.g., RSRP values) expected at an (approximate) area, region, or vicinity of a target UE from the satellite nodes, the LMF may configure a positioning process for the target UE. In some examples, the determinations by the LMF may include determining a minimum, expected, and/or maximum number of satellite nodes in range or in sight of the target UE. For instance, the LMF may determine how many satellite nodes are expected to provide a signal strength (e.g., PRS RSRP) at the target UE and then decide, based on the number, whether to configure a positioning process for the target UE by the satellite nodes.

Figure 21:
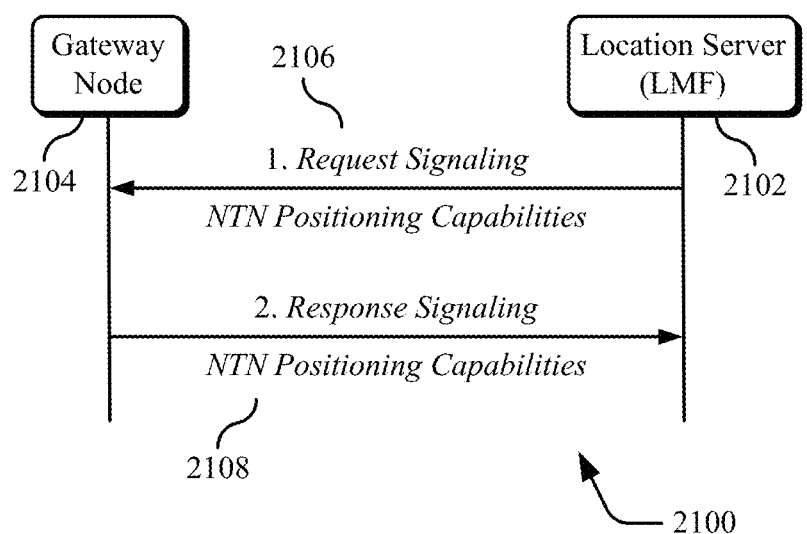
FIG. 21 illustrates another example of a signaling exchange as related to positioning capability data exchange in an NTN in accordance with aspects of the present disclosure.

FIG. 21 illustrates an example 2100 of a signaling exchange as related to positioning capability data exchange in an NTN in accordance with aspects of the present disclosure. This example 2100 includes a location server 2102 that implements the LMF communicating with a gateway node 2104 (e.g., the functionality collocated with the gateway node) by network signaling, such as for LMF and gateway node (NG-RAN) capability exchange. The signaling exchange between the location server 2102 and the gateway node 2104 includes a request 2106 for NTN positioning capabilities and a response 2108 of the NTN positioning capabilities. The LMF may determine the NTN positioning capabilities of a gateway node, which may be incorporated in the overall positioning procedures, such as uplink-based positioning methods. The gateway node, for example, may be connected to at least one or more satellites (e.g., NTSs).

The capability information received in the response from the gateway node may include any one or combination of location management component (LMC) functionality provided by the gateway node, a gNB-CU, a gNB satellite, and/or gNB-DU satellite; network architecture information, such as whether the NTN, an NTN node, an NTN link, etc. is based on a regenerative-payload architecture (RPA) or a TPA; and/or a minimum, expected, average, or typical, and/or maximum response time for location measurement reporting. Details of the signaling and functions of the LMF may be defined similarly as described above for capability signaling between a satellite node and the LMF.

Aspects of the disclosure include positioning information exchange with a gateway node. Positioning information exchange with an NTN node may have some similarities to positioning information exchange with a TN node, however the positioning capability signaling has differences communicating with a gateway node. Similar to the signaling for TN-based positioning, the positioning information exchange procedure may be initiated by the LMF to request NTN NG-RAN node or gateway positioning information for a UE.

Figure 22:
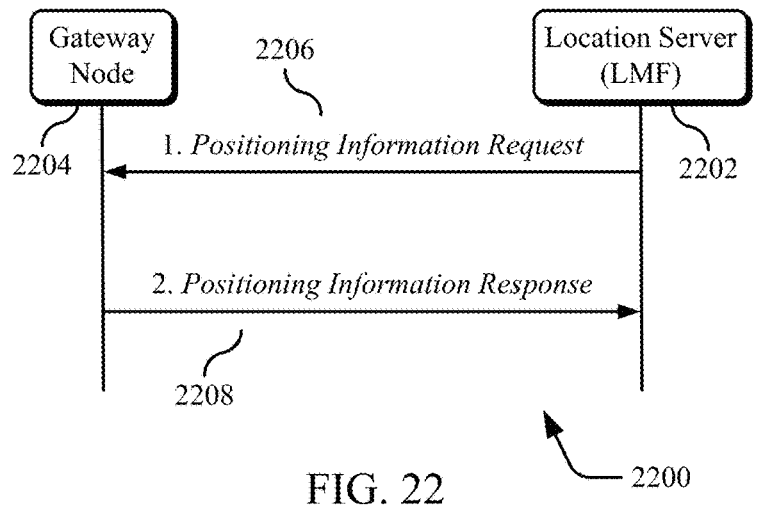
FIG. 22 illustrates an example of a positioning information exchange as related to positioning capability data exchange in an NTN in accordance with aspects of the present disclosure.

FIG. 22 illustrates an example 2200 of a positioning information exchange as related to positioning capability data exchange in an NTN in accordance with aspects of the present disclosure. This example 2200 includes a location server 2202 that implements the LMF communicating with a gateway node 2204 by a signaling exchange, such as for a positioning information exchange procedure resulting in a successful exchange. The signaling exchange between the location server 2202 and the gateway node 2204 includes a positioning information request 2206 and a positioning information response 2208. The LMF at the location server 2202 may initiate the procedure by sending the positioning information request 2206 as a message to the gateway node 2204. Upon successful positioning computation and communication, the gateway node 2204 may respond to the location server 2202 (e.g., the LMF) with the positioning information response 2208 as a message for successful operation.

Figure 23:
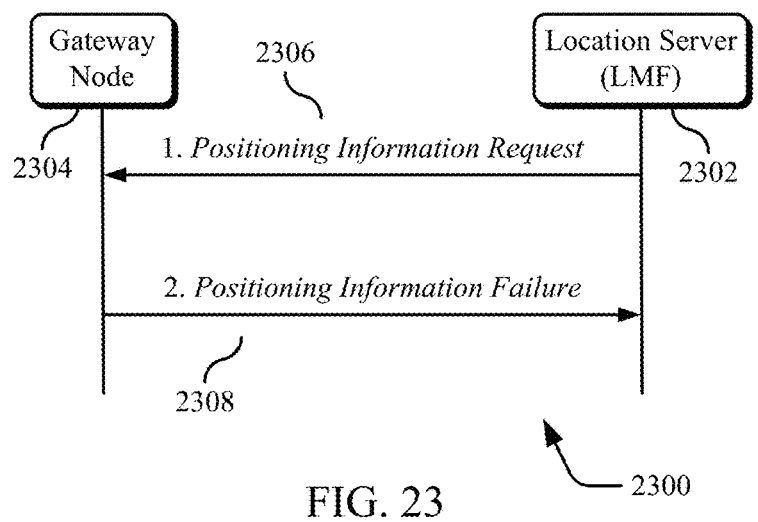
FIG. 23 illustrates another example of a positioning information exchange as related to positioning capability data exchange in an NTN in accordance with aspects of the present disclosure.

FIG. 23 illustrates an example 2300 of a positioning information exchange as related to positioning capability data exchange in an NTN in accordance with aspects of the present disclosure. This example 2300 includes a location server 2302 that implements the LMF communicating with a gateway node 2304 by a signaling exchange, such as for a positioning information exchange procedure resulting in a failed exchange. The signaling exchange between the location server 2302 and the gateway node 2304 includes a positioning information request 2306 and a positioning information response 2308. The LMF at the location server 2302 may initiate the procedure by sending the positioning information request 2306 as a message to the gateway node 2304. If the positioning measurement and/or communication is not successful, the gateway node 2404 may then send the positioning information failure response 2308 as a failure message to the LMF at the location server 2402. In implementations, the gateway may be the closest node to the edge of the NTN that remains in a static location, while the NTSs (e.g., satellites) move.

In an implementation, the gateway reports a positioning information failure upon determining that a satellite node configured for the associated positioning process is not connected to the gateway. In another implementation, the gateway reports a positioning information failure upon determining that a satellite node configured for the associated positioning process is close to disconnection or switchover to another gateway, and the gateway may report the positioning information failure upon determining that a feeder link switchover is in progress. The gateway node may also report a positioning information failure upon determining that a feeder link switchover is imminent, such as when it is likely or certain to occur earlier than a threshold. The threshold may be configured by the LMF or by the NTN, as indicated by a signaling, or determined by a specification or implementation. The gateway node may determine that a feeder link switchover is imminent based on a predetermined schedule, a movement trajectory of the satellite, information of a next gateway in the vicinity, a signal strength (e.g., RSRP from the satellite, or a combination thereof.

Figure 24:
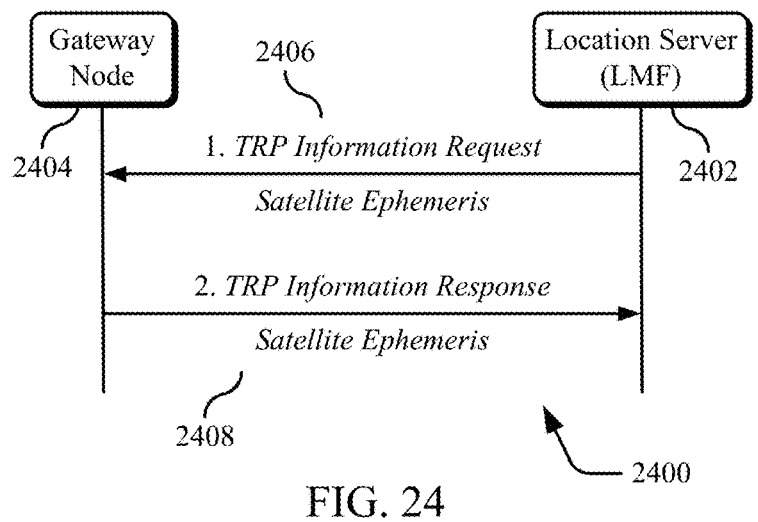
FIG. 24 illustrates an example of a signaling request-response exchange as related to positioning capability data exchange in an NTN in accordance with aspects of the present disclosure.

FIG. 24 illustrates an example 2400 of a signaling request-response exchange as related to positioning capability data exchange in an NTN in accordance with aspects of the present disclosure. This example 2400 includes a location server 2402 that implements the LMF communicating with a gateway node 2404 by request-response signaling, such as to obtain satellite ephemeris information for configuring a positioning process. The signaling exchange between the location server 2402 and the NTN node 2404 includes a TRP information request 2406 for satellite ephemeris information and a TRP information response 2408 of the satellite ephemeris information. As an alternative to obtaining information of a minimum, typical, or maximum number of satellites in range or in sight of a UE, the LMF may obtain related information by requesting information of satellite ephemeris from one or multiple gateway nodes.

Then, based on the ephemeris information in the response signaling from the one or multiple gateway nodes, the signal strength of each of the satellites may provide, at an approximate area, region, or vicinity of the target UE, and other related information, the LMF may determine whether to configure a positioning process for a target UE through one or multiple of the probed satellites. For example, the LMF may indicate the type(s) and quantities of ephemeris information in the request message. The type(s) and quantities of satellite ephemeris may include any one or combination of identifiers (IDs) of the satellite nodes of interest, a current location of the satellite node (e.g., in 3D coordinates), an expected location of a satellite node at an indicated time (e.g., as indicated in the request message), a current velocity of the satellite node (e.g., a velocity in 3D coordinates), an expected velocity of the satellite node at the indicated time, a time stamp, such as associated with the location and/or velocity information, and/or a nominal orbit for LEO/MEO satellite systems.

In response, the gateway node may send the response message with values for the type(s) and quantities of the satellite ephemeris indicated in the request message. Then, based on the information received from one or multiple gateway nodes, combined with other related information such as signal strength values (e.g., RSRP values) expected at an (approximate) area, region, or vicinity of a target UE from the satellite nodes, the LMF may configure a positioning process for the target UE. In some examples, the LMF may determine a minimum, expected, or maximum number of satellite nodes in range or in sight of the target UE. For instance, the LMF may determine how many satellite nodes are expected to provide a signal strength (e.g., PRS RSRP) at the target UE and then decide, based in part on the number, whether to configure a positioning process for the target UE by the satellite nodes.

Figure 25:
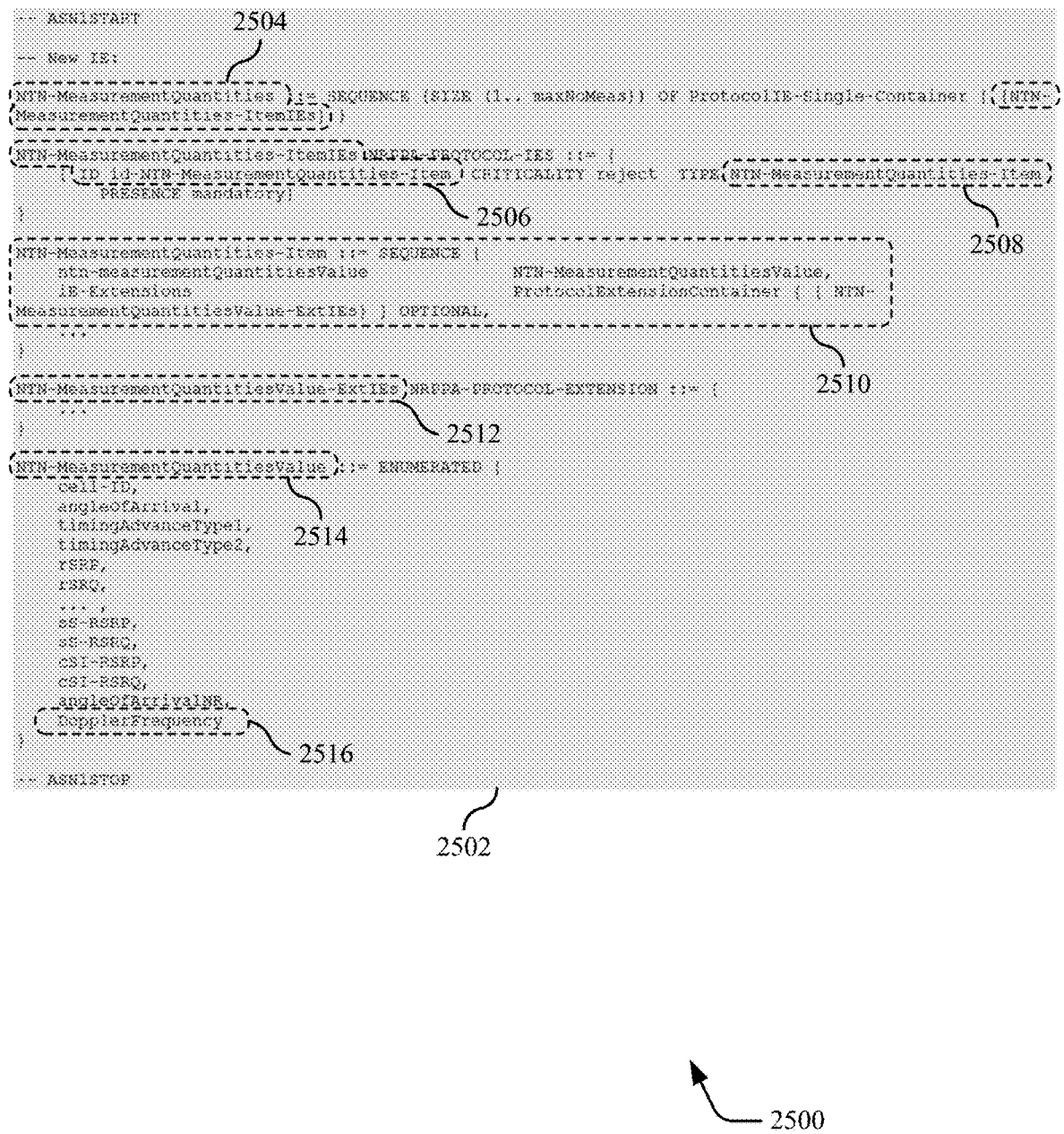
FIG. 25 illustrates an example of ASN.1 code for an information element (IE) as related to positioning capability data exchange in an NTN in accordance with aspects of the present disclosure.

FIG. 25 illustrates an example 2500 of ASN.1 code for an information element (IE) as related to positioning capability data exchange in an NTN in accordance with aspects of the present disclosure. Several of the information elements (IEs) associated with configurations and protocols used for NTN-based positioning may be modified to accommodate the requirements and configurations related to NTN. This example 2500 illustrates proposed and/or augmented signaling and parameters in an information element (IE) 2502 that may be applied to NR positioning protocol A (NRPPa) in order to support NTN-based positioning. The proposed and/or augmented signaling and parameters are identified at 2504 through 2516 in the example information element (ILE) 2502. The information elements (IEs) specific to NTN-based positioning may be defined, and parameters associated with Doppler frequency measurements in the downlink (by the UE) or in the uplink (by the satellite/gNB, NTS) may be implemented in new information elements (IEs) or enhanced in existing information elements (IEs).

FIG. 26 illustrates another example 2600 of ASN.1 code for an information element (IE) as related to positioning capability data exchange in an NTN in accordance with aspects of the present disclosure. This example 2600 illustrates proposed and/or augmented signaling and parameters in an information element (IE) 2602 that may be applied to NR positioning protocol A (NRPPa) in order to support NTN-based positioning. The proposed and/or augmented signaling and parameters are identified at 2604 through 2628 in the example information element (IE) 2602.

FIG. 27 illustrates an example 2700 of ASN.1 code for an information element (IE) as related to positioning capability data exchange in an NTN in accordance with aspects of the present disclosure. This example 2700 illustrates an information element (IE) 2702 with the addition of a new RAT-dependent value 2704, "nR-NTN" added to ASN1START.

Aspects of positioning capability data exchange in an NTN are described with reference to various implementations of an NTN architecture. Further, various implementations are based on measurements of reference signals originating from the non-terrestrial transmit-receive point (NT-TRP) (e.g., a satellite or other NTS). However, it should be noted that a reference signal may also originate elsewhere in the NTN (e.g., not at the NT-TRP). The network node that generates the downlink signals, including the downlink reference signals used for positioning determinations, may or may not be the non-terrestrial transmit-receive point (NT-TRP), depending on the architecture of the NTN.

In aspects of the disclosure, an NTN architecture may be implemented as a RPA. For example, a full gNB or a DU of the base station may be implemented onboard a satellite, from which the downlink signals are generated. The information that may be obtained based on the service link between the non-terrestrial transmit-receive point (NT-TRP) and the UE includes: the propagation delay of the service link, which may affect the timing of the resources used for transmitting and/or receiving reference signals, performing measurements, and so on; the pathloss of the service link, which affects a signal quality of strength such as the RSRP; and the Doppler frequency shift associated with the service link, which may be used for adjusting timing and/or used directly for obtaining or refining an estimate of the position of the UE.

Alternatively, an NTN architecture may be implemented as a TPA. For example, a full gNB or a DU of the base station may be communicatively connected to the gateway. Accordingly, the downlink signals are generated before the signals are transmitted to the non-terrestrial transmit-receive point (NT-TRP) and then relayed to the UE. In this case, the information that may be obtained based on the feeder link between the gateway and/or gNB, and the non-terrestrial transmit-receive point (NT-TRP), in addition to the service link between the non-terrestrial transmit-receive point (NT-TRP) and the UE, includes: propagation delay(s) of the feeder link and/or the service link, which may affect the timing of the resources used for transmitting and/or receiving reference signals, performing measurements, and so on; the pathloss of the feeder link and/or the service link, which affects a signal quality of strength such as an RSRP; and the Doppler frequency shift associated with the feeder link, the service link, or a combination of the feeder link and the service link, which may be used for adjusting timing and/or used directly for obtaining or refining an estimate of the position of the UE.

Further, the NTN architecture may be based on a combination of a RPA and a TPA. In implementations, the non-terrestrial transmit-receive point (NT-TRP) communicatively connected to the gateway may not be directly connected to the UE, but rather may be connected over multiple hops through inter-satellite links (ISLs). Any or all of the information discussed above may be obtained via, and/or be associated with, the inter-satellite links (ISLs).

The various positioning methods (techniques, procedures) for positioning may be implemented in combination with each other to support NR positioning using the supported NTN interfaces, network entities, and network nodes. A positioning-related reference signal may be referred to as a reference signal, which includes positioning information, and may be used for positioning procedures, positioning determinations, or other positioning purposes, such as to estimate the location of a target UE. A reference signal may be a PRS, or based on existing reference signals, such as a channel-state information reference signal (CSI-RS) or a SRS. In the various implementations, the term PRS refers to any reference signal that may or may not be used for positioning determinations. A target UE may be referred to as the device or network entity to be localized and/or position determined. A target UE may also be referred to as a UE of interest, and the position of the device is to be obtained by the network or by the UE itself.

The terms transmit point (TP), receive point (RP), transmit-receive point (TRP), gNB, and base station may be used interchangeably throughout the disclosure, and may refer to a network entity or network node. Any or all these terms may refer to a network entity transmitting or receiving a signal, such as a reference signal, used for positioning, also referred to as positioning determinations, methods, and/or techniques. Depending on the NTN architecture, the positioning configurations, and other factors, the network node and/or entity may generate or relay a reference signal, perform a positioning computation, and/or communicate the positioning-related information to another network entity or network node.

In aspects of this disclosure for positioning capability data exchange in an NTN, location capability exchange procedures may be implemented for communication between a NTN TRP (e.g., a satellite or NTS) and a location server that implements the LMF; between a satellite gateway and the LMF; and/or between a target UE and the LMF. Additionally, request-response signaling methods or procedures may be implemented for obtaining ephemeris and other related information from the satellite(s) and/or gateway(s). Further, function and operability options for the LMF may be implemented to configure positioning processes based on the received information.

The NTN positioning may be different from TN positioning with respect to longer propagation delays, moving satellites in the case of LEO and MEO satellite systems, larger pathloss, uncertainty about the number of satellites in range at any moment, and so on. However, NTN positioning provides advantages over ground-cellular-based positioning, such as to make positioning possible in rural and remote areas, and for satellites in LEO or MEO systems travel on predictable trajectories and at high speeds, hence allowing positioning based on Doppler. Enabling NTN positioning may depend on how these differences affect the NG-RAN signaling, which is key to positioning configuration and operation. In this disclosure, signaling methods (procedures techniques) are described to implement capability exchange, obtaining NTN information for positioning configuration and operation purposes, and for other positioning operations.

The described systems and methods are based on NG-RAN signaling with enhancements related to the NTN. Information related to the augmented, proposed, and/or enhanced signaling may include any type of NTN node or NTS (e.g., GEO, MEO, LEO satellites, HAPS, UAV, etc.), movement trajectory, minimum, typical, or maximum number of NTN nodes in range or in sight of a target UE, location management component (LMC) functionalities, architecture information (e.g., regenerative payload vs. transparent payload), a minimum, average, or maximum propagation delay and/or response time, etc. The configuration and operability of the LMF may be based in part on the received information. In NTN (e.g., satellite) systems, the LMF obtains the positioning information for configuration and signaling. Additionally, the LMF may determine whether to configure a positioning process based on the current number of satellites in range or in sight of the target UE, based on the signal strength, and/or based on several other factors, such as whether a signaling failure may occur without the LMF prepared to accommodate new configurations.

Figure 28:
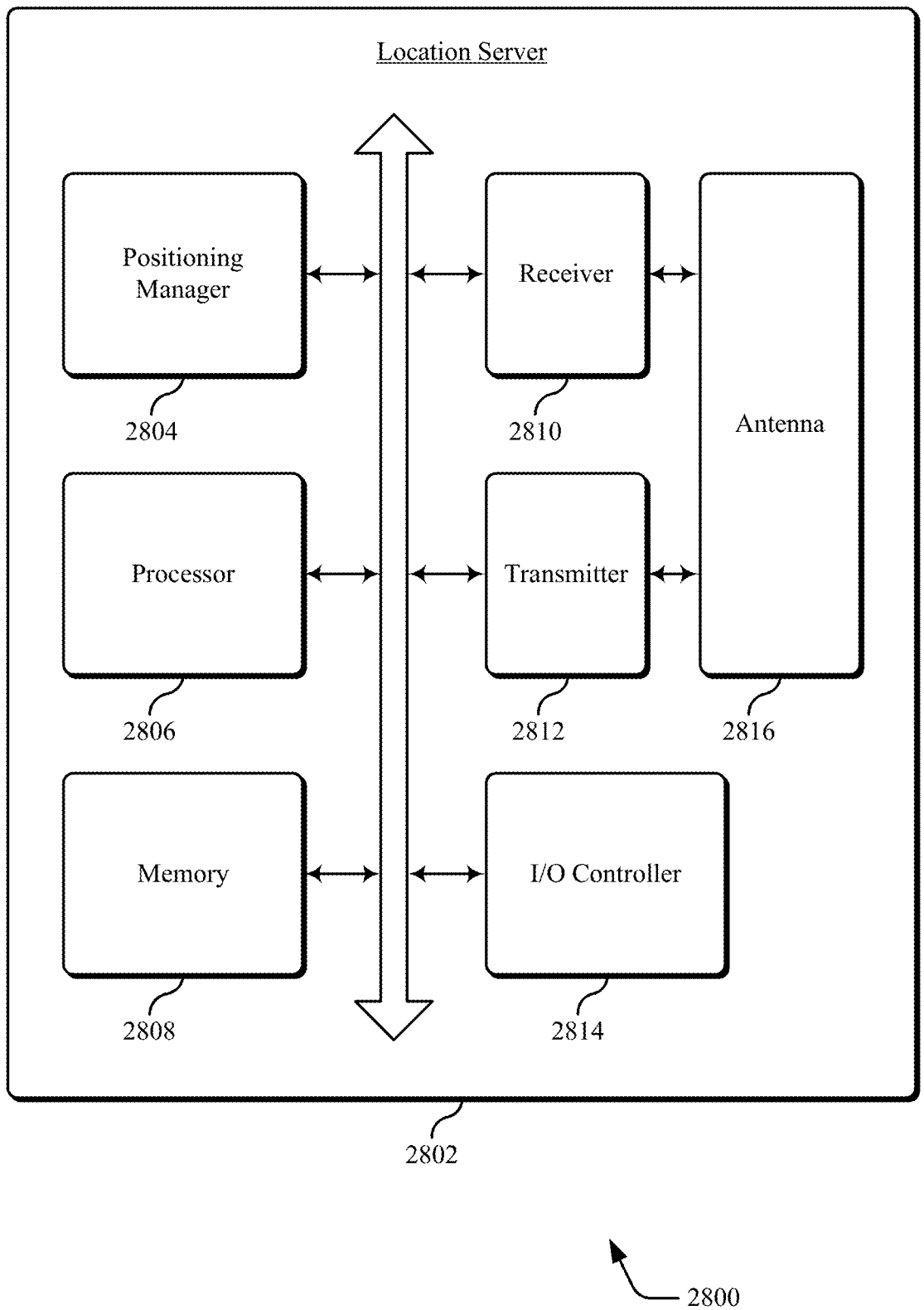
FIG. 28 illustrates an example block diagram of components of a location server that supports positioning capability data exchange in an NTN in accordance with aspects of the present disclosure.

FIG. 28 illustrates an example of a block diagram 2800 of a device 2802 that supports positioning capability data exchange in an NTN in accordance with aspects of the present disclosure. The device 2802 may be an example of a location server, such as a location server that implements the LMF, as described herein. The device 2802 may support wireless communication with one or more base stations 102, UE 104, NTSs, NTN entities and devices, or any combination thereof. The device 2802 may include components for bi-directional communications including components for transmitting and receiving communications, such as a positioning manager 2804, a processor 2806, a memory 2808, a receiver 2810, a transmitter 2812, and an I/O controller 2814. These components may be in electronic communication or otherwise coupled (e.g., operatively, communicatively, functionally, electronically, electrically) via one or more interfaces (e.g., buses).

The positioning manager 2804, the receiver 2810, the transmitter 2812, or various combinations thereof or various components thereof may be examples of means for performing various aspects of the present disclosure as described herein. For example, the positioning manager 2804, the receiver 2810, the transmitter 2812, or various combinations or components thereof may support a method for performing one or more of the functions described herein.

In some implementations, the positioning manager 2804, the receiver 2810, the transmitter 2812, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2806 and the memory 2808 coupled with the processor 2806 may be configured to perform one or more of the functions described herein (e.g., by executing, by the processor 2806, instructions stored in the memory 2808).

Additionally or alternatively, in some implementations, the positioning manager 2804, the receiver 2810, the transmitter 2812, or various combinations or components thereof may be implemented in code (e.g., as communications management software or firmware) executed by the processor 2806. If implemented in code executed by the processor 2806, the functions of the positioning manager 2804, the receiver 2810, the transmitter 2812, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the positioning manager 2804 may be configured to perform various operations (e.g., receiving, monitoring, transmitting) using or otherwise in cooperation with the receiver 2810, the transmitter 2812, or both. For example, the positioning manager 2804 may receive information from the receiver 2810, send information to the transmitter 2812, or be integrated in combination with the receiver 2810, the transmitter 2812, or both to receive information, transmit information, or perform various other operations as described herein. Although the positioning manager 2804 is illustrated as a separate component, in some implementations, one or more functions described with reference to the positioning manager 2804 may be supported by or performed by the processor 2806, the memory 2808, or any combination thereof. For example, the memory 2808 may store code, which may include instructions executable by the processor 2806 to cause the device 2802 to perform various aspects of the present disclosure as described herein, or the processor 2806 and the memory 2808 may be otherwise configured to perform or support such operations.

For example, the positioning manager 2804 may support wireless communication and/or capability exchange signaling at a location server 2802 (e.g., the LMF) in accordance with examples as disclosed herein. The positioning manager 2804 and/or other device components may be configured as or otherwise support an apparatus, such as a location server, including a transceiver to: transmit a control signaling request to a non-terrestrial station in a non-terrestrial network, the control signaling requesting an entity type of the non-terrestrial station, and ephemeris data associated with the non-terrestrial station; receive a control signaling response from the non-terrestrial station, the control signaling response indicating configuration parameter values; and a positioning manager to configure positioning assistance data for positioning a user equipment based in part on the configuration parameter values received in the control signaling response.

Additionally, the apparatus (e.g., a location server) includes any one or combination of: the positioning manager is configured to determine an expected number of non-terrestrial network nodes located to facilitate the positioning for the user equipment. The control signaling requests an architecture type of the non-terrestrial network associated with the non-terrestrial station, the architecture type based on a regenerative payload architecture of the non-terrestrial network or a transparent payload architecture of the non-terrestrial network. The entity type of the non-terrestrial station is a satellite or a next-generation NodeB-enabled satellite. The control signaling requests a number of network nodes in range of a location of the non-terrestrial station, the network nodes including one or more of terrestrial network nodes or non-terrestrial network nodes. The number of network nodes in range of the location of the non-terrestrial station is one of a minimum number of the network nodes, a typical number of the network nodes, or a maximum number of the network nodes. The ephemeris data associated with the non-terrestrial station includes: a location of the non-terrestrial station, a velocity of the non-terrestrial station, an expected location of the non-terrestrial station at a future time instance, an expected velocity of the non-terrestrial station at the future time instance, and a movement trajectory of the non-terrestrial station.

The positioning manager 2804 and/or other device components may be configured as or otherwise support an apparatus, such as a location server, including a transceiver to: transmit a control signaling request to a non-terrestrial network configuration entity in a non-terrestrial network, the control signaling requesting one or more of an identifier of a non-terrestrial station, ephemeris data associated with the non-terrestrial station, an entity type of the non-terrestrial network configuration entity, or a number of non-terrestrial network nodes communicatively connected to the non-terrestrial network configuration entity; receive a control signaling response from the non-terrestrial network configuration entity, the control signaling response indicating configuration parameter values; and a positioning manager to configure positioning assistance data for positioning a user equipment based in part on the configuration parameter values received in the control signaling response.

Additionally, the apparatus (e.g., a location server) includes any one or combination of: the positioning manager is configured to determine an expected number of non-terrestrial network nodes located to facilitate the positioning for the user equipment. The control signaling requests an architecture type of the non-terrestrial network associated with the non-terrestrial network configuration entity, the architecture type based on a regenerative payload architecture of the non-terrestrial network or a transparent payload architecture of the non-terrestrial network. The entity type of the non-terrestrial network configuration entity is a ground-based gateway or a satellite-based gateway. The number of the non-terrestrial network nodes communicatively connected to the non-terrestrial network configuration entity is one of a minimum number of the non-terrestrial network nodes, a typical number of non-terrestrial network nodes, or a maximum number of non-terrestrial network nodes. The control signaling requests a number of network nodes in range of a location of the non-terrestrial station, the network nodes including one or more of terrestrial network nodes or non-terrestrial network nodes. The number of network nodes in range of the location of the non-terrestrial station is one of a minimum number of the network nodes, a typical number of the network nodes, or a maximum number of the network nodes. The ephemeris data associated with the non-terrestrial station includes: a location of the non-terrestrial station, a velocity of the non-terrestrial station, an expected location of the non-terrestrial station at a future time instance, an expected velocity of the non-terrestrial station at the future time instance, and a movement trajectory of the non-terrestrial station.

The positioning manager 2804 and/or other device components may be configured as or otherwise support a means for capability exchange signaling at a location server, including transmitting a control signaling request to a non-terrestrial station in a non-terrestrial network, the control signaling requesting an entity type of the non-terrestrial station, and ephemeris data associated with the non-terrestrial station; receiving a control signaling response from the non-terrestrial station, the control signaling response indicating configuration parameter values; and configuring positioning assistance data for positioning a user equipment based in part on the configuration parameter values received in the control signaling response.

Additionally, capability exchange signaling at the user equipment includes any one or combination of determining an expected number of non-terrestrial network nodes located to facilitate the positioning for the user equipment. The method further comprising initiating the non-terrestrial station to configure the positioning assistance data for positioning the user equipment based on the configuration parameter values received in the control signaling response. The control signaling requests an architecture type of the non-terrestrial network associated with the non-terrestrial station, the architecture type based on a regenerative payload architecture of the non-terrestrial network or a transparent payload architecture of the non-terrestrial network. The entity type of the non-terrestrial station is a satellite or a next-generation NodeB-enabled satellite. The control signaling requests a number of network nodes in range of a location of the non-terrestrial station, the network nodes including one or more of terrestrial network nodes or non-terrestrial network nodes. The number of network nodes in range of the location of the non-terrestrial station is one of a minimum number of the network nodes, a typical number of the network nodes, or a maximum number of the network nodes. The ephemeris data associated with the non-terrestrial station includes: a location of the non-terrestrial station, a velocity of the non-terrestrial station, an expected location of the non-terrestrial station at a future time instance, an expected velocity of the non-terrestrial station at the future time instance, and a movement trajectory of the non-terrestrial station. The control signaling requests a type of beam polarization associated with positioning reference signals for the positioning of the user equipment.

The positioning manager 2804 and/or other device components may be configured as or otherwise support an apparatus, such as a location server, including a transceiver to: transmit a request message to a network entity in a non-terrestrial network, the request message requesting an entity type of a non-terrestrial station and ephemeris data associated with the non-terrestrial station; receive a response message from the network entity, the response message comprising parameter values; and a positioning manager to configure positioning assistance data for positioning a user equipment based in part on the configuration parameter values received in the response message.

Additionally, the apparatus (e.g., a location server) includes any one or combination of: the parameter values are associated with the entity type of the non-terrestrial station and the ephemeris data associated with the non-terrestrial station. The positioning manager determines an expected number of non-terrestrial network nodes located to facilitate the positioning for the user equipment. The request message further requesting a number of network nodes in range of a location of the non-terrestrial station, the network nodes including one or more of terrestrial network nodes or non-terrestrial network nodes; and the parameter values include a value indicating the number of the network nodes in range of the location of the non-terrestrial station. The ephemeris data associated with the non-terrestrial station comprises at least one of: a location of the non-terrestrial station, a velocity of the non-terrestrial station, an expected location of the non-terrestrial station at a future time instance, an expected velocity of the non-terrestrial station at the future time instance, or a movement trajectory of the non-terrestrial station. The request message further requesting an architecture type of the non-terrestrial network associated with the non-terrestrial station, the architecture type based on a regenerative payload architecture of the non-terrestrial network or a transparent payload architecture of the non-terrestrial network; and the parameter values include a value indicating the architecture type of the non-terrestrial network. The entity type of the non-terrestrial station is a satellite or a next-generation NodeB-enabled satellite. The number of network nodes in range of the location of the non-terrestrial station is one of a minimum number of the network nodes, a typical number of the network nodes, or a maximum number of the network nodes.

The positioning manager 2804 and/or other device components may be configured as or otherwise support an apparatus, such as a location server, including a transceiver to: transmit a request message to a non-terrestrial network configuration entity in a non-terrestrial network, the request message requesting one or more of an identifier of a non-terrestrial station, ephemeris data associated with the non-terrestrial station, an entity type of the non-terrestrial network configuration entity, or a number of non-terrestrial network nodes connected to the non-terrestrial network configuration entity; receive a response message from the non-terrestrial network configuration entity, the response message indicating parameter values; and a positioning manager to configure positioning assistance data for positioning a user equipment based in part on the parameter values received in the response message.

Additionally, the apparatus (e.g., a location server) includes any one or combination of: the parameter values received in the response message are associated with one or more of the identifier of the non-terrestrial station, the ephemeris data, the entity type of the non-terrestrial network configuration entity, or the number of the non-terrestrial network nodes connected to the non-terrestrial network configuration entity. The positioning manager determines an expected number of non-terrestrial network nodes located to facilitate the positioning for the user equipment. The request message further requests an architecture type of the non-terrestrial network associated with the non-terrestrial network configuration entity, the architecture type based on a regenerative payload architecture of the non-terrestrial network or a transparent payload architecture of the non-terrestrial network; and the parameter values received in the response message including a value indicating the architecture type of the non-terrestrial network. The request message further requests a number of network nodes in range of a location of the non-terrestrial station, the network nodes including one or more of terrestrial network nodes or non-terrestrial network nodes; and the parameter values received in the response message including a value indicating the number of the network nodes in range of the location of the non-terrestrial station. The number of the network nodes in range of the location of the non-terrestrial station is one of a minimum number of the network nodes, a typical number of the network nodes, or a maximum number of the network nodes. The ephemeris data associated with the non-terrestrial station comprises at least one of: a location of the non-terrestrial station, a velocity of the non-terrestrial station, an expected location of the non-terrestrial station at a future time instance, an expected velocity of the non-terrestrial station at the future time instance, or a movement trajectory of the non-terrestrial station. The entity type of the non-terrestrial network configuration entity is a ground-based gateway or a satellite-based gateway. The number of the non-terrestrial network nodes connected to the non-terrestrial network configuration entity is one of a minimum number of the non-terrestrial network nodes, a typical number of non-terrestrial network nodes, or a maximum number of non-terrestrial network nodes.

The positioning manager 2804 and/or other device components may be configured as or otherwise support a means for capability exchange signaling at a location server, including transmitting a request message to a network entity in a non-terrestrial network, the request message requesting an entity type of a non-terrestrial station and ephemeris data associated with the non-terrestrial station; receiving a response message from the network entity, the response message comprising parameter values associated with the entity type of the non-terrestrial station and the ephemeris data; and configuring positioning assistance data for positioning a user equipment based in part on the parameter values received in the response message. The method further comprising determining an expected number of non-terrestrial network nodes located to facilitate the positioning for the user equipment. The method further comprising initiating the non-terrestrial station to configure the positioning assistance data for positioning the user equipment based on the configuration parameter values received in the response message.

The positioning manager 2804 and/or other device components may be configured as or otherwise support a means for capability exchange signaling at a location server, including transmitting a control signaling request to a non-terrestrial network configuration entity in a non-terrestrial network, the control signaling requesting one or more of an identifier of a non-terrestrial station, ephemeris data associated with the non-terrestrial station, an entity type of the non-terrestrial network configuration entity, or a number of non-terrestrial network nodes communicatively connected to the non-terrestrial network configuration entity; receiving a control signaling response from the non-terrestrial network configuration entity, the control signaling response indicating configuration parameter values; and configuring positioning assistance data for positioning a user equipment based in part on the configuration parameter values received in the control signaling response.

Additionally, capability exchange signaling at the user equipment includes any one or combination of: determining an expected number of non-terrestrial network nodes located to facilitate the positioning for the user equipment. The method further comprising initiating the non-terrestrial network configuration entity to configure the positioning assistance data for positioning the user equipment based in part on the configuration parameter values received in the control signaling response. The control signaling requests an architecture type of the non-terrestrial network associated with the non-terrestrial network configuration entity, the architecture type based on a regenerative payload architecture of the non-terrestrial network or a transparent payload architecture of the non-terrestrial network. The entity type of the non-terrestrial network configuration entity is a ground-based gateway or a satellite-based gateway. The number of the non-terrestrial network nodes communicatively connected to the non-terrestrial network configuration entity is one of a minimum number of the non-terrestrial network nodes, a typical number of non-terrestrial network nodes, or a maximum number of non-terrestrial network nodes. The control signaling requests a number of network nodes in range of a location of the non-terrestrial station, the network nodes including one or more of terrestrial network nodes or non-terrestrial network nodes. The number of network nodes in range of the location of the non-terrestrial station is one of a minimum number of the network nodes, a typical number of the network nodes, or a maximum number of the network nodes. The ephemeris data associated with the non-terrestrial station includes: a location of the non-terrestrial station, a velocity of the non-terrestrial station, an expected location of the non-terrestrial station at a future time instance, an expected velocity of the non-terrestrial station at the future time instance, and a movement trajectory of the non-terrestrial station.

The processor 2806 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2806 may be configured to operate a memory array using a memory controller. In some other implementations, a memory controller may be integrated into the processor 2806. The processor 2806 may be configured to execute computer-readable instructions stored in a memory (e.g., the memory 2808) to cause the device 2802 to perform various functions of the present disclosure.

The memory 2808 may include random access memory (RAM) and read-only memory (ROM). The memory 2808 may store computer-readable, computer-executable code including instructions that, when executed by the processor 2806 cause the device 2802 to perform various functions described herein. The code may be stored in a non-transitory computer-readable medium such as system memory or another type of memory. In some implementations, the code may not be directly executable by the processor 2806 but may cause a computer (e.g., when compiled and executed) to perform functions described herein. In some implementations, the memory 2808 may include, among other things, a basic I/O system (BIOS) which may control basic hardware or software operation such as the interaction with peripheral components or devices.

The I/O controller 2814 may manage input and output signals for the device 2802. The I/O controller 2814 may also manage peripherals not integrated into the device 2802. In some implementations, the I/O controller 2814 may represent a physical connection or port to an external peripheral. In some implementations, the F/O controller 2814 may utilize an operating system such as iOS®, ANDROID®, MS-DOS®, MS-WINDOWS®, OS/2®, UNIX®, LINUX®, or another known operating system. In some implementations, the I/O controller 2814 may be implemented as part of a processor, such as the processor 2806. In some implementations, a user may interact with the device 2802 via the I/O controller 2814 or via hardware components controlled by the I/O controller 2814.

In some implementations, the device 2802 may include a single antenna 2816. However, in some other implementations, the device 2802 may have more than one antenna 2816, which may be capable of concurrently transmitting or receiving multiple wireless transmissions. The receiver 2810 and the transmitter 2812 may communicate bi-directionally, via the one or more antennas 2816, wired, or wireless links as described herein. For example, the receiver 2810 and the transmitter 2812 may represent a wireless transceiver and may communicate bi-directionally with another wireless transceiver. The transceiver may also include a modem to modulate the packets, to provide the modulated packets to one or more antennas 2816 for transmission, and to demodulate packets received from the one or more antennas 2816.

Figure 29:
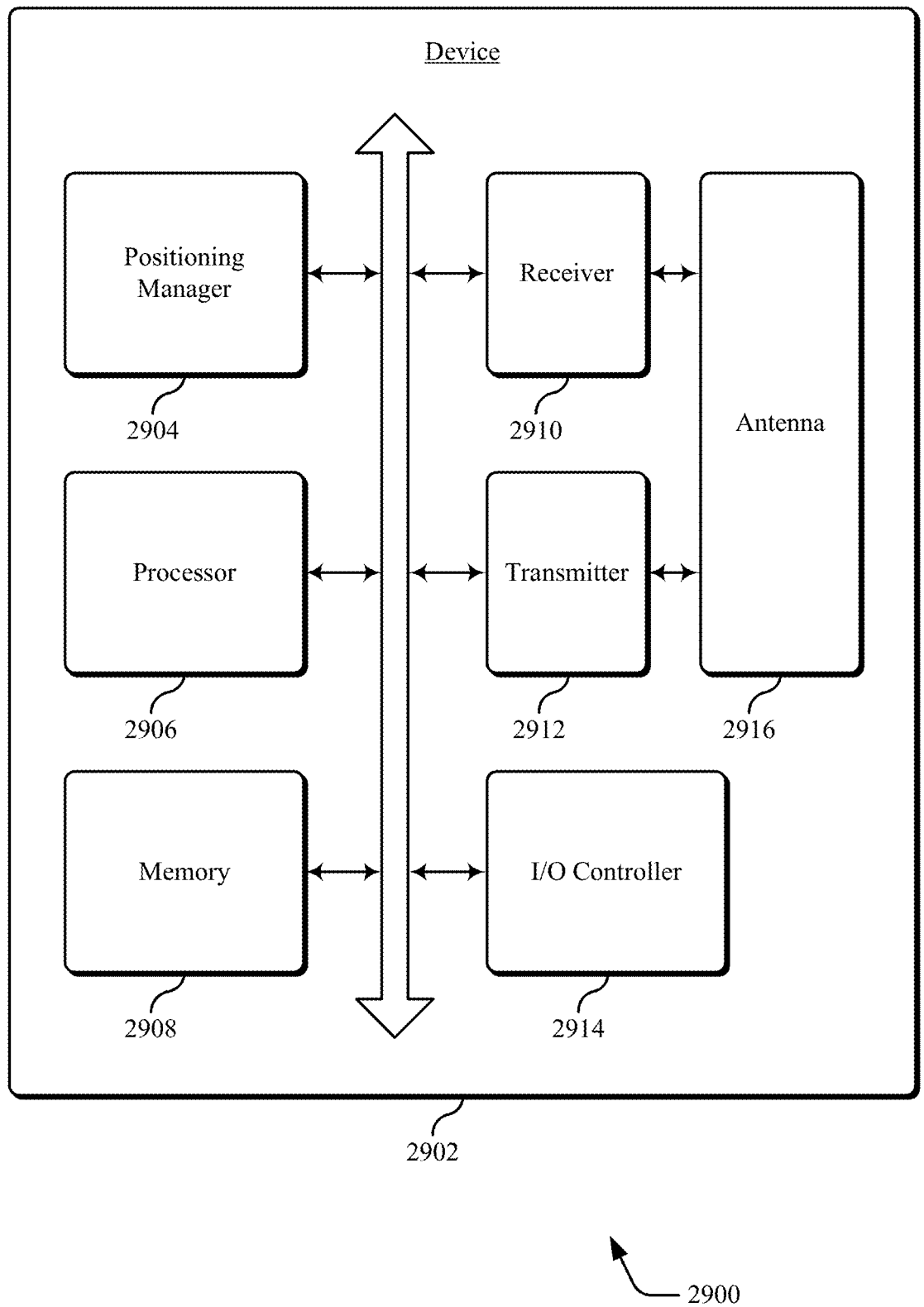
FIG. 29 illustrates an example block diagram of components of a device that supports positioning capability data exchange in an NTN in accordance with aspects of the present disclosure.

FIG. 29 illustrates an example of a block diagram 2900 of a device 2902 that supports positioning capability data exchange in an NTN in accordance with aspects of the present disclosure. The device 2902 may be an example of any type of NTN entity, such as an NTN gateway, an NTN configuration entity, a NTS, a satellite, a gNB-enabled satellite, or a UE 104 as described herein. The device 2902 may support wireless communication with one or more base stations 102, UE 104, or any combination thereof. The device 2902 may include components for bi-directional communications including components for transmitting and receiving communications, such as a positioning manager 2904, a processor 2906, a memory 2908, a receiver 2910, a transmitter 2912, and an I/O controller 2914. These components may be in electronic communication or otherwise coupled (e.g., operatively, communicatively, functionally, electronically, electrically) via one or more interfaces (e.g., buses).

The positioning manager 2904, the receiver 2910, the transmitter 2912, or various combinations thereof or various components thereof may be examples of means for performing various aspects of the present disclosure as described herein. For example, the positioning manager 2904, the receiver 2910, the transmitter 2912, or various combinations or components thereof may support a method for performing one or more of the functions described herein.

In some implementations, the positioning manager 2904, the receiver 2910, the transmitter 2912, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2906 and the memory 2908 coupled with the processor 2906 may be configured to perform one or more of the functions described herein (e.g., by executing, by the processor 2906, instructions stored in the memory 2908).

Additionally or alternatively, in some implementations, the positioning manager 2904, the receiver 2910, the transmitter 2912, or various combinations or components thereof may be implemented in code (e.g., as communications management software or firmware) executed by the processor 2906. If implemented in code executed by the processor 2906, the functions of the positioning manager 2904, the receiver 2910, the transmitter 2912, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the positioning manager 2904 may be configured to perform various operations (e.g., receiving, monitoring, transmitting) using or otherwise in cooperation with the receiver 2910, the transmitter 2912, or both. For example, the positioning manager 2904 may receive information from the receiver 2910, send information to the transmitter 2912, or be integrated in combination with the receiver 2910, the transmitter 2912, or both to receive information, transmit information, or perform various other operations as described herein. Although the positioning manager 2904 is illustrated as a separate component, in some implementations, one or more functions described with reference to the positioning manager 2904 may be supported by or performed by the processor 2906, the memory 2908, or any combination thereof. For example, the memory 2908 may store code, which may include instructions executable by the processor 2906 to cause the device 2902 to perform various aspects of the present disclosure as described herein, or the processor 2906 and the memory 2908 may be otherwise configured to perform or support such operations.

For example, the positioning manager 2904 may support wireless communication at a device (e.g., the device 2902, an NTN entity) in accordance with examples as disclosed herein. The positioning manager 2904 and/or other device components may be configured as or otherwise support an apparatus, such as an NTN entity, including a transceiver to: receive a control signaling request from a location server in a non-terrestrial network, the control signaling requesting an entity type of the non-terrestrial network entity, and ephemeris data associated with a non-terrestrial station of the non-terrestrial network; and transmit a control signaling response to the location server, the control signaling response indicating configuration parameter values usable to configure positioning assistance data for positioning a user equipment.

Additionally, the apparatus (e.g., an NTN entity) includes any one or combination of: the control signaling requests an architecture type of the non-terrestrial network associated with the non-terrestrial network entity, the architecture type based on a regenerative payload architecture of the non-terrestrial network or a transparent payload architecture of the non-terrestrial network. The entity type of the non-terrestrial network entity is a gateway. The non-terrestrial station is a satellite or a next-generation NodeB-enabled satellite. The control signaling requests a number of network nodes in range of a location of the non-terrestrial station, the network nodes including one or more of terrestrial network nodes or non-terrestrial network nodes. The ephemeris data associated with the non-terrestrial station includes: a location of the non-terrestrial station, a velocity of the non-terrestrial station, an expected location of the non-terrestrial station at a future time instance, an expected velocity of the non-terrestrial station at the future time instance, and a movement trajectory of the non-terrestrial station.

The positioning manager 2904 and/or other device components may be configured as or otherwise support a means for capability exchange signaling at an NTN entity, including receiving a control signaling request from a location server in a non-terrestrial network, the control signaling requesting an entity type of the non-terrestrial network entity, and ephemeris data associated with a non-terrestrial station of the non-terrestrial network; transmitting a control signaling response to the location server, the control signaling response indicating configuration parameter values usable to configure positioning assistance data for positioning a user equipment.

Additionally, capability exchange signaling at the NTN entity includes any one or combination of: determining an expected number of non-terrestrial network nodes located to facilitate the positioning for the user equipment. The method further comprising initiating the non-terrestrial station to configure the positioning assistance data for positioning the user equipment based on the configuration parameter values in the control signaling response. The control signaling requests an architecture type of the non-terrestrial network associated with the non-terrestrial network entity, the architecture type based on a regenerative payload architecture of the non-terrestrial network or a transparent payload architecture of the non-terrestrial network. The non-terrestrial station is a satellite or a next-generation NodeB-enabled satellite. The control signaling requests a number of network nodes in range of a location of the non-terrestrial station, the network nodes including one or more of terrestrial network nodes or non-terrestrial network nodes. The ephemeris data associated with the non-terrestrial station includes: a location of the non-terrestrial station, a velocity of the non-terrestrial station, an expected location of the non-terrestrial station at a future time instance, an expected velocity of the non-terrestrial station at the future time instance, and a movement trajectory of the non-terrestrial station.

The processor 2906 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2906 may be configured to operate a memory array using a memory controller. In some other implementations, a memory controller may be integrated into the processor 2906. The processor 2906 may be configured to execute computer-readable instructions stored in a memory (e.g., the memory 2908) to cause the device 2902 to perform various functions of the present disclosure.

The memory 2908 may include random access memory (RAM) and read-only memory (ROM). The memory 2908 may store computer-readable, computer-executable code including instructions that, when executed by the processor 2906 cause the device 2902 to perform various functions described herein. The code may be stored in a non-transitory computer-readable medium such as system memory or another type of memory. In some implementations, the code may not be directly executable by the processor 2906 but may cause a computer (e.g., when compiled and executed) to perform functions described herein. In some implementations, the memory 2908 may include, among other things, a basic I/O system (BIOS) which may control basic hardware or software operation such as the interaction with peripheral components or devices.

The I/O controller 2914 may manage input and output signals for the device 2902. The I/O controller 2914 may also manage peripherals not integrated into the device 2902. In some implementations, the I/O controller 2914 may represent a physical connection or port to an external peripheral. In some implementations, the I/O controller 2914 may utilize an operating system such as iOS®, ANDROID®, MS-DOS®, MS-WINDOWS®, OS/2®, UNIX®, LINUX®, or another known operating system. In some implementations, the I/O controller 2914 may be implemented as part of a processor, such as the processor 2906. In some implementations, a user may interact with the device 2902 via the I/O controller 2914 or via hardware components controlled by the I/O controller 2914.

In some implementations, the device 2902 may include a single antenna 2916. However, in some other implementations, the device 2902 may have more than one antenna 2916, which may be capable of concurrently transmitting or receiving multiple wireless transmissions. The receiver 2910 and the transmitter 2912 may communicate bi-directionally, via the one or more antennas 2916, wired, or wireless links as described herein. For example, the receiver 2910 and the transmitter 2912 may represent a wireless transceiver and may communicate bi-directionally with another wireless transceiver. The transceiver may also include a modem to modulate the packets, to provide the modulated packets to one or more antennas 2916 for transmission, and to demodulate packets received from the one or more antennas 2916.

Figure 30:
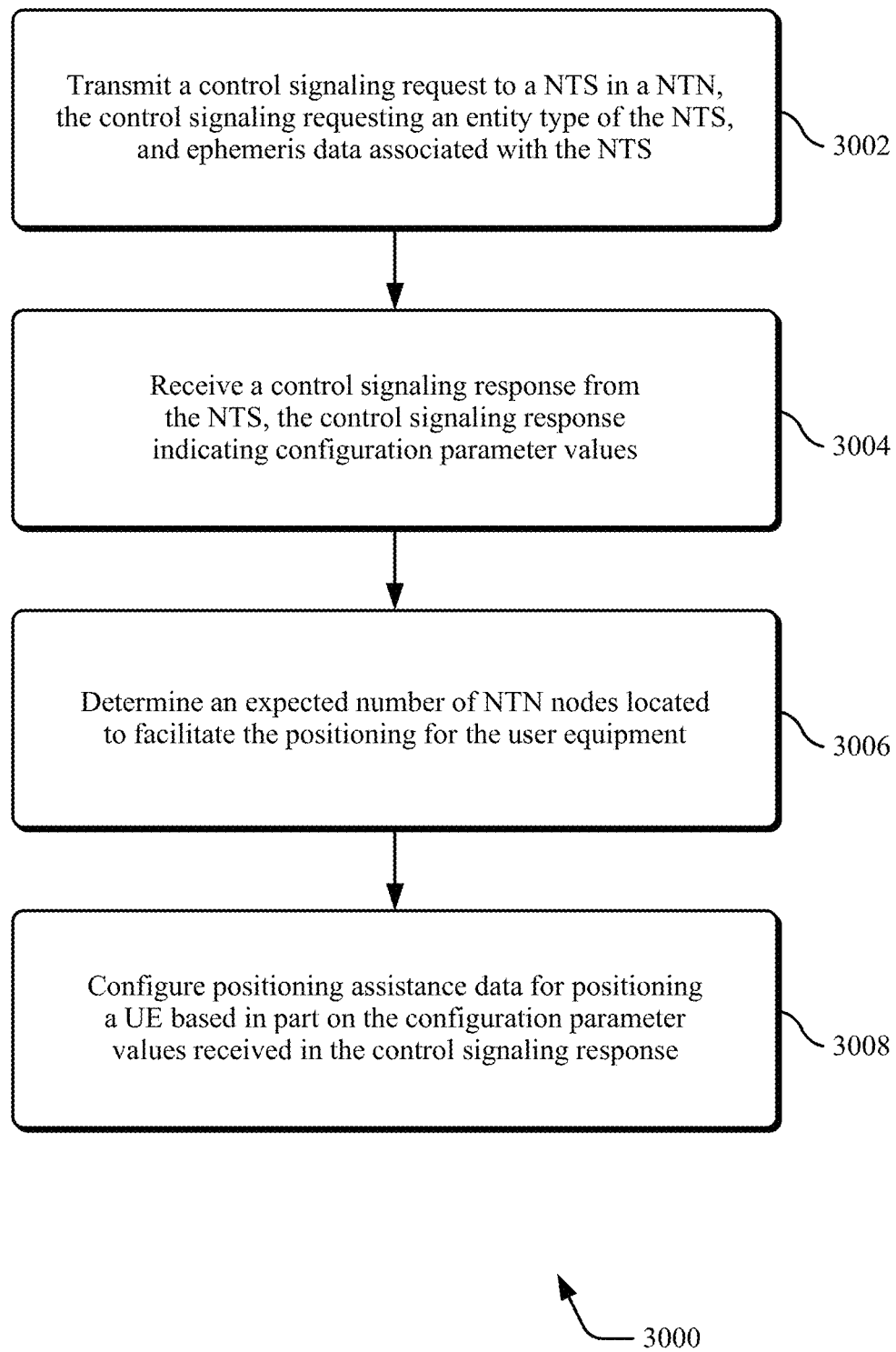
FIGS. 30, 31, and 32 illustrate flowcharts of methods that support positioning capability data exchange in an NTN in accordance with aspects of the present disclosure.

FIG. 30 illustrates a flowchart of a method 3000 that supports positioning capability data exchange in an NTN in accordance with aspects of the present disclosure. The operations of the method 3000 may be implemented by a device or its components as described herein. For example, the operations of the method 3000 may be performed by a location server that implements the LMF as described with reference to FIGS. 1 through 29. In some implementations, the device may execute a set of instructions to control the function elements of the device to perform the described functions. Additionally, or alternatively, the device may perform aspects of the described functions using special-purpose hardware.

At 3002, the method may include transmitting a control signaling request to a NTS in an NTN, the control signaling requesting an entity type of the NTS, and ephemeris data associated with the NTS. The operations of 3002 may be performed in accordance with examples as described herein. In some implementations, aspects of the operations of 3002 may be performed by a device as described with reference to FIG. 1.

At 3004, the method may include receiving a control signaling response from the NTS, the control signaling response indicating configuration parameter values. The operations of 3004 may be performed in accordance with examples as described herein. In some implementations, aspects of the operations of 3004 may be performed by a device as described with reference to FIG. 1.

At 3006, the method may include determining an expected number of NTN nodes located to facilitate the positioning for the UE. The operations of 3006 may be performed in accordance with examples as described herein. In some implementations, aspects of the operations of 3006 may be performed by a device as described with reference to FIG. 1.

At 3008, the method may include configuring positioning assistance data for positioning a UE based in part on the configuration parameter values received in the control signaling response. In an implementation, the NTS may be implemented to configure the positioning assistance data for positioning the UE. The operations of 3008 may be performed in accordance with examples as described herein. In some implementations, aspects of the operations of 3008 may be performed by a device as described with reference to FIG. 1.

Figure 31:
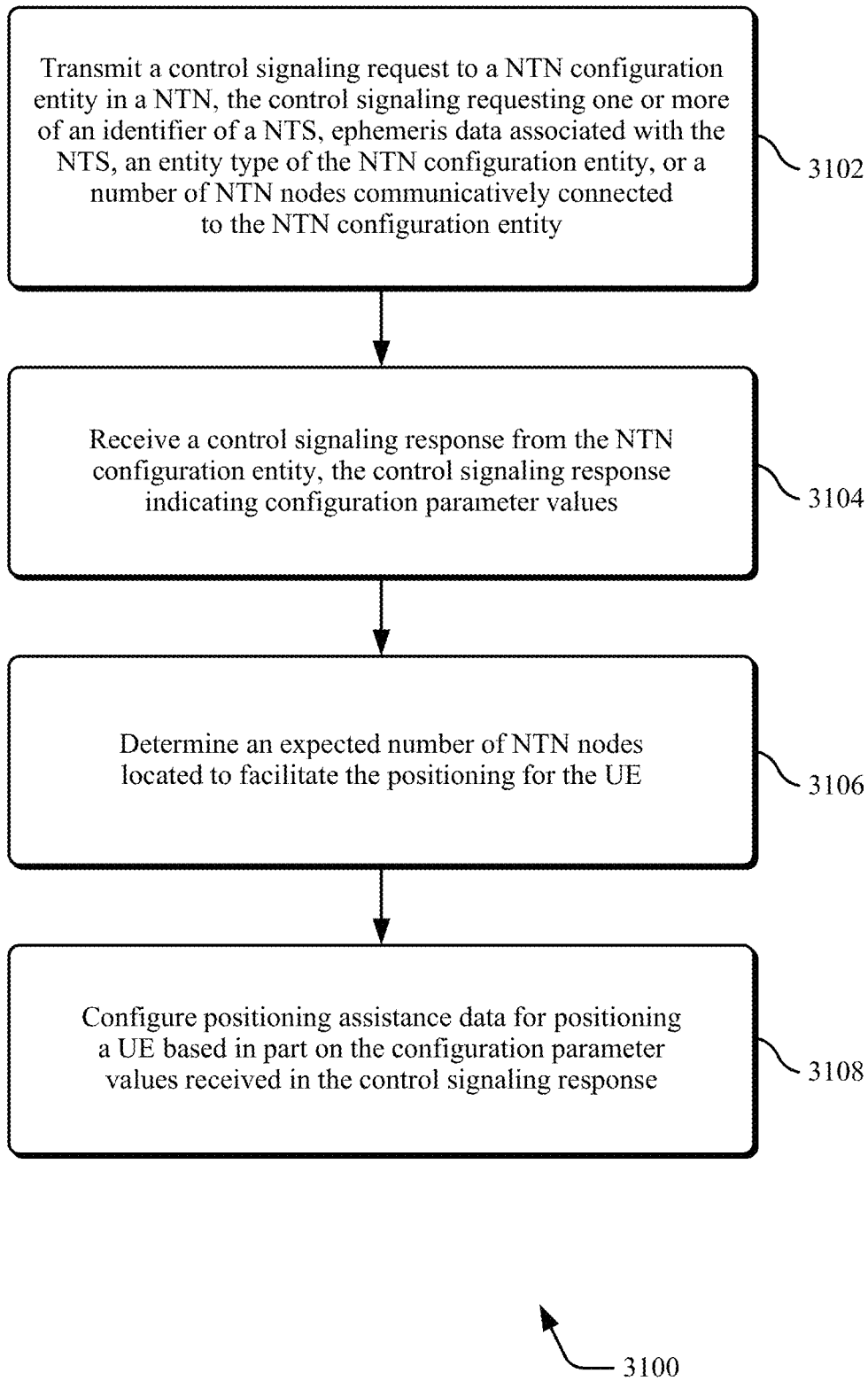

FIG. 31 illustrates a flowchart of a method 3100 that supports positioning capability data exchange in an NTN in accordance with aspects of the present disclosure. The operations of the method 3100 may be implemented by a device or its components as described herein. For example, the operations of the method 3100 may be performed by a location server that implements the LMF as described with reference to FIGS. 1 through 29. In some implementations, the device may execute a set of instructions to control the function elements of the device to perform the described functions. Additionally, or alternatively, the device may perform aspects of the described functions using special-purpose hardware.

At 3102, the method may include transmitting a control signaling request to a NTN configuration entity in a NTN, the control signaling requesting one or more of an identifier of a NTS, ephemeris data associated with the NTS, an entity type of the NTN configuration entity, or a number of NTN nodes communicatively connected to the NTN configuration entity. The operations of 3102 may be performed in accordance with examples as described herein. In some implementations, aspects of the operations of 3102 may be performed by a device as described with reference to FIG. 1.

At 3104, the method may include receiving a control signaling response from the NTN configuration entity, the control signaling response indicating configuration parameter values. The operations of 3104 may be performed in accordance with examples as described herein. In some implementations, aspects of the operations of 3104 may be performed by a device as described with reference to FIG. 1.

At 3106, the method may include determining an expected number of NTN nodes located to facilitate the positioning for the UE. The operations of 3106 may be performed in accordance with examples as described herein. In some implementations, aspects of the operations of 3106 may be performed by a device as described with reference to FIG. 1.

At 3108, the method may include configuring positioning assistance data for positioning a UE based in part on the configuration parameter values received in the control signaling response. In an implementation, the non-terrestrial network configuration entity is initiated to configure the positioning assistance data for positioning the UE. The operations of 3108 may be performed in accordance with examples as described herein. In some implementations, aspects of the operations of 3108 may be performed by a device as described with reference to FIG. 1.

Figure 32:
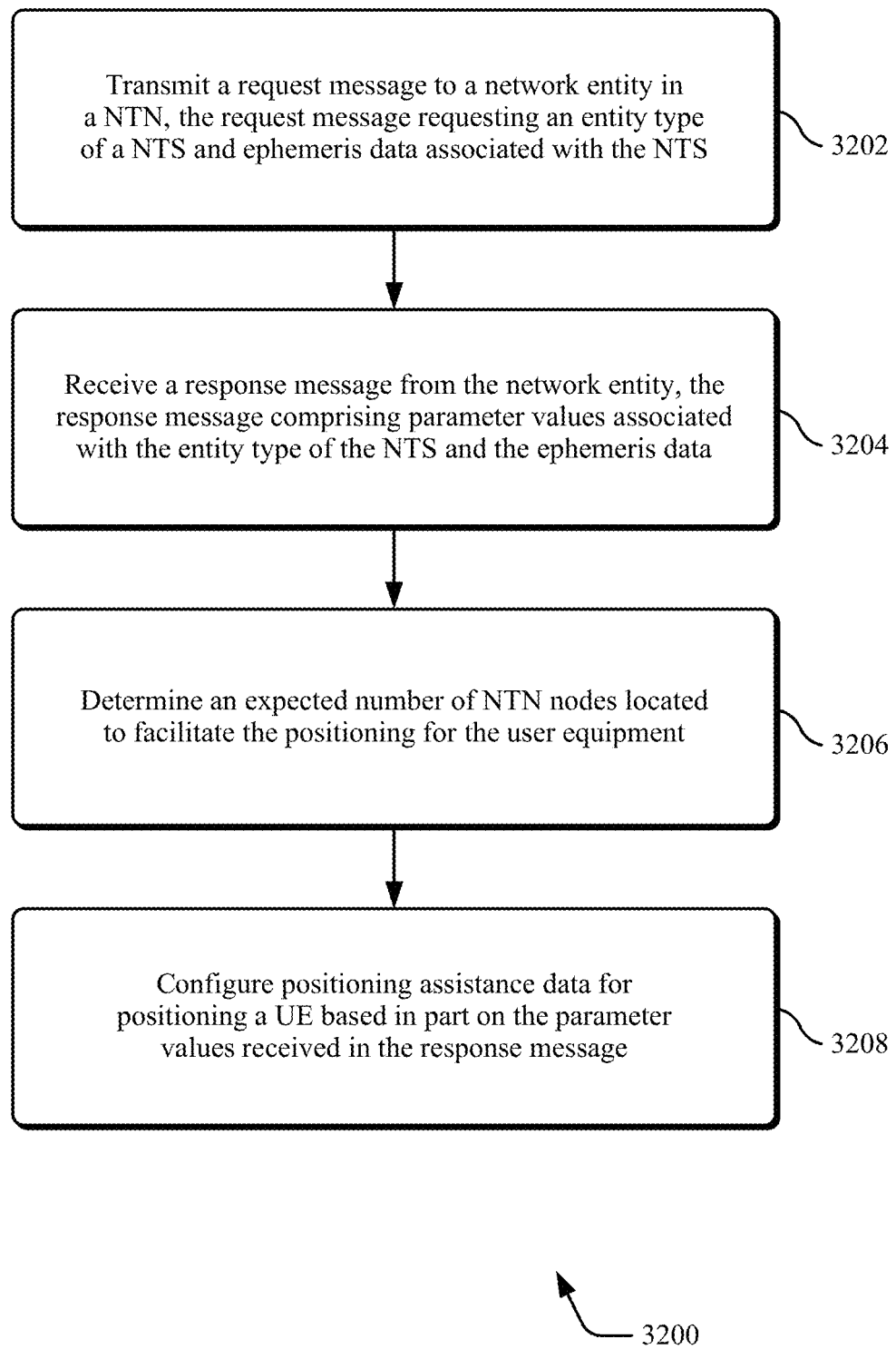

FIG. 32 illustrates a flowchart of a method 3200 that supports transmitting a request message to a network entity in a NTN, the request message requesting an entity type of a NTS and ephemeris data associated with the NTS. The operations of the method 3200 may be implemented by a device or its components as described herein. For example, the operations of the method 3200 may be performed by a location server that implements the LMF as described with reference to FIGS. 1 through 29. In some implementations, the device may execute a set of instructions to control the function elements of the device to perform the described functions. Additionally, or alternatively, the device may perform aspects of the described functions using special-purpose hardware.

At 3202, the method may include transmitting a control signaling request to a NTS in an NTN, the control signaling requesting an entity type of the NTS, and ephemeris data associated with the NTS. The operations of 3202 may be performed in accordance with examples as described herein. In some implementations, aspects of the operations of 3202 may be performed by a device as described with reference to FIG. 1.

At 3204, the method may include receiving a response message from the network entity, the response message comprising parameter values associated with the entity type of the NTS and the ephemeris data. The operations of 3204 may be performed in accordance with examples as described herein. In some implementations, aspects of the operations of 3204 may be performed by a device as described with reference to FIG. 1.

At 3206, the method may include determining an expected number of NTN nodes located to facilitate the positioning for the user equipment. The operations of 3206 may be performed in accordance with examples as described herein. In some implementations, aspects of the operations of 3206 may be performed by a device as described with reference to FIG. 1.

At 3208, the method may include configuring positioning assistance data for positioning a UE based in part on the parameter values received in the response message. In an implementation, the NTS may be implemented to configure the positioning assistance data for positioning the UE. The operations of 3208 may be performed in accordance with examples as described herein. In some implementations, aspects of the operations of 3208 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a transceiver to:
transmit a request message to a network entity in a non-terrestrial network (NTN), the request message requesting an entity type of a non-terrestrial station and ephemeris data associated with the non-terrestrial station;
receive a response message from the network entity, the response message comprising parameter values; and
a positioning manager to configure positioning assistance data for positioning a user equipment (UE) based in part on the parameter values received in the response message.

2. The apparatus of claim 1, wherein the parameter values are associated with the entity type of the non-terrestrial station and the ephemeris data associated with the non-terrestrial station.

3. The apparatus of claim 1, wherein the positioning manager determines an expected number of NTN nodes located to facilitate the positioning for the UE.

4. The apparatus of claim 1, wherein:
the request message further requesting a number of network nodes in range of a location of the non-terrestrial station, the network nodes including one or more of terrestrial network nodes or NTN nodes; and
the parameter values include a value indicating the number of the network nodes in range of the location of the non-terrestrial station.

5. The apparatus of claim 4, wherein the number of network nodes in range of the location of the non-terrestrial station is one of a minimum number of the network nodes, a typical number of the network nodes, or a maximum number of the network nodes.

6. The apparatus of claim 1, wherein the ephemeris data associated with the non-terrestrial station comprises at least one of:
a location of the non-terrestrial station,
a velocity of the non-terrestrial station,
an expected location of the non-terrestrial station at a future time instance,
an expected velocity of the non-terrestrial station at the future time instance, or
a movement trajectory of the non-terrestrial station.

7. The apparatus of claim 1, wherein:
the request message further requesting an architecture type of the NTN associated with the non-terrestrial station, the architecture type based on a regenerative payload architecture of the NTN or a transparent payload architecture of the NTN; and
the parameter values include a value indicating the architecture type of the non terrestrial network.

8. The apparatus of claim 1, wherein the entity type of the non-terrestrial station is a satellite or a next-generation NodeB-enabled satellite.

9. An apparatus, comprising:
a transceiver to:
transmit a request message to a non-terrestrial network (NTN) configuration entity in a NTN, the request message requesting one or more of an identifier of a non-terrestrial station, ephemeris data associated with the non-terrestrial station, an entity type of the non-terrestrial network configuration entity, or a number of NTN nodes connected to the non terrestrial network configuration entity;
receive a response message from the NTN configuration entity, the response message indicating parameter values; and
a positioning manager to configure positioning assistance data for positioning a user equipment (UE) based in part on the parameter values received in the response message.

10. The apparatus of claim 9, wherein the parameter values received in the response message are associated with one or more of the identifier of the non-terrestrial station, the ephemeris data, the entity type of the non terrestrial network configuration entity, or the number of the NTN nodes connected to the non terrestrial network configuration entity.

11. The apparatus of claim 9, wherein the positioning manager determines an expected number of NTN nodes located to facilitate the positioning for the UE.

12. The apparatus of claim 9, wherein:
the request message further requests an architecture type of the NTN network associated with the NTN configuration entity, the architecture type based on a regenerative payload architecture of the NTN or a transparent payload architecture of the NTN; and
the parameter values received in the response message including a value indicating the architecture type of the non terrestrial network.

13. The apparatus of claim 9, wherein:
the request message further requests a number of network nodes in range of a location of the non-terrestrial station, the network nodes including one or more of terrestrial network nodes or NTN nodes; and
the parameter values received in the response message including a value indicating the number of the network nodes in range of the location of the non-terrestrial station.

14. The apparatus of claim 13, wherein the number of the network nodes in range of the location of the non-terrestrial station is one of a minimum number of the network nodes, a typical number of the network nodes, or a maximum number of the network nodes.

15. The apparatus of claim 9, wherein the ephemeris data associated with the non-terrestrial station comprises at least one of:
a location of the non-terrestrial station,
a velocity of the non-terrestrial station,
an expected location of the non-terrestrial station at a future time instance,
an expected velocity of the non-terrestrial station at the future time instance, or
a movement trajectory of the non-terrestrial station.

16. The apparatus of claim 9, wherein the entity type of the NTN configuration entity is a ground-based gateway or a satellite-based gateway.

17. The apparatus of claim 9, wherein the number of the NTN nodes connected to the NTN configuration entity is one of a minimum number of the NTN nodes, a typical number of NTN nodes, or a maximum number of NTN nodes.

18. A method for capability exchange signaling at a location server, the method comprising:
- transmitting a request message to a network entity in a non-terrestrial network (NTN), the request message requesting an entity type of a non-terrestrial station and ephemeris data associated with the non-terrestrial station;
- receiving a response message from the network entity, the response message comprising parameter values associated with the entity type of the non-terrestrial station and the ephemeris data; and
- configuring positioning assistance data for positioning a user equipment (UE) based in part on the parameter values received in the response message.

19. The method of claim 18, further comprising determining an expected number of NTN nodes located to facilitate the positioning for the UE.

20. The method of claim 18, further comprising initiating the non-terrestrial station to configure the positioning assistance data for positioning the UE based on the parameter values received in the response message.

* * * * *